US008924209B2

(12) United States Patent
Newman

(10) Patent No.: US 8,924,209 B2
(45) Date of Patent: Dec. 30, 2014

(54) IDENTIFYING SPOKEN COMMANDS BY TEMPLATES OF ORDERED VOICED AND UNVOICED SOUND INTERVALS

(75) Inventor: David Edward Newman, Temecula, CA (US)

(73) Assignee: Zanavox, Temecula, CA (US)

( * ) Notice: Subject to any disclaimer, the term of this patent is extended or adjusted under 35 U.S.C. 154(b) by 322 days.

(21) Appl. No.: 13/610,858

(22) Filed: Sep. 12, 2012

(65) Prior Publication Data

US 2014/0074481 A1 Mar. 13, 2014

(51) Int. Cl.
*G10L 15/10* (2006.01)
*G10L 25/93* (2013.01)

(52) U.S. Cl.
USPC ............................ 704/231; 704/208; 704/214

(58) Field of Classification Search
CPC ................................ G10L 15/10; G10L 25/93
USPC ......... 704/213, 214, 231, 241, 251, 254, 275, 704/208
See application file for complete search history.

(56) References Cited

U.S. PATENT DOCUMENTS

| | | | | | |
|---|---|---|---|---|---|
| 3,688,126 | A * | 8/1972 | Klein | 307/116 |
| 4,357,488 | A * | 11/1982 | Knighton et al. | 704/246 |
| 4,509,186 | A * | 4/1985 | Omura et al. | 704/231 |
| 4,852,181 | A * | 7/1989 | Morito et al. | 704/233 |
| 5,101,434 | A * | 3/1992 | King | 704/241 |
| 5,305,420 | A * | 4/1994 | Nakamura et al. | 704/271 |
| 6,208,967 | B1 * | 3/2001 | Pauws et al. | 704/256.8 |
| 6,301,562 | B1 * | 10/2001 | Azima et al. | 704/257 |
| 6,553,342 | B1 * | 4/2003 | Zhang et al. | 704/255 |
| 7,523,038 | B2 | 4/2009 | Ariav | |
| 8,781,821 | B2 * | 7/2014 | Newman | 704/214 |
| 8,862,476 | B2 * | 10/2014 | Newman | 704/275 |
| 2003/0130846 | A1 * | 7/2003 | King | 704/256 |
| 2006/0129392 | A1 * | 6/2006 | Kim | 704/233 |
| 2009/0271196 | A1 * | 10/2009 | Nyquist et al. | 704/246 |
| 2009/0313016 | A1 * | 12/2009 | Cevik et al. | 704/241 |
| 2013/0093445 | A1 * | 4/2013 | Newman | 324/750.3 |
| 2013/0290000 | A1 * | 10/2013 | Newman | 704/275 |
| 2014/0142949 | A1 * | 5/2014 | Newman | 704/275 |
| 2014/0297287 | A1 * | 10/2014 | Newman | 704/275 |

* cited by examiner

*Primary Examiner* — Martin Lerner

(57) ABSTRACT

A method is disclosed for identifying a spoken command by detecting intervals of voiced and unvoiced sound, and then comparing the order of voiced and unvoiced sounds to a set of templates. Each template represents one of the predetermined acceptable commands of the application, and is associated with a predetermined action. When the order of voiced and unvoiced intervals in the spoken command matches the order in one of the templates, the associated action is thus selected. Silent intervals in the command may also be included for enhanced recognition. Efficient protocols are disclosed for discriminating voiced and unvoiced sounds, and for detecting the beginning and ending of each sound interval in the command, and for comparing the command sequence to the templates. In a sparse-command application, this method provides fast and robust recognition, and can be implemented with low-cost hardware and extremely minimal software.

17 Claims, 10 Drawing Sheets

Figure 2

Command sequence from Figure 1

| | | | | | | | | |
|---|---|---|---|---|---|---|---|---|
| Voiced | 1 | 0 | 1 | 0 | 0 | 0 | 0 | 0 |
| Unvoiced | 0 | 1 | 0 | 1 | 0 | 0 | 0 | 0 |

Templates:

| SYSTEM | S | Y | ST | EM | | | | |
|---|---|---|---|---|---|---|---|---|
| Voiced | 0 | 1 | 0 | 1 | 0 | 0 | 0 | 0 |
| Unvoiced | 1 | 0 | 1 | 0 | 0 | 0 | 0 | 0 |

| START | ST | AR | T | | | | | |
|---|---|---|---|---|---|---|---|---|
| Voiced | 0 | 1 | 0 | 0 | 0 | 0 | 0 | 0 |
| Unvoiced | 1 | 0 | 1 | 0 | 0 | 0 | 0 | 0 |

| LEFT | LE | FT | | | | | | |
|---|---|---|---|---|---|---|---|---|
| Voiced | 1 | 0 | 0 | 0 | 0 | 0 | 0 | 0 |
| Unvoiced | 0 | 1 | 0 | 0 | 0 | 0 | 0 | 0 |

| RESET | RE | S | E | T | | | | |
|---|---|---|---|---|---|---|---|---|
| Voiced | 1 | 0 | 1 | 0 | 0 | 0 | 0 | 0 |
| Unvoiced | 0 | 1 | 0 | 1 | 0 | 0 | 0 | 0 |

Figure 6

Command sequence from Figure 4:

| | | | | | | | | |
|---|---|---|---|---|---|---|---|---|
| Voiced | 1 | 0 | 0 | 1 | 0 | 0 | 0 | 0 |
| Unvoiced | 0 | 1 | 0 | 0 | 0 | 0 | 0 | 0 |

Templates:

| GO | GO | | | | | | | |
|---|---|---|---|---|---|---|---|---|
| Voiced | 1 | 0 | 0 | 0 | 0 | 0 | 0 | 0 |
| Unvoiced | 0 | 0 | 0 | 0 | 0 | 0 | 0 | 0 |

| SO | S | O | | | | | | |
|---|---|---|---|---|---|---|---|---|
| Voiced | 0 | 1 | 0 | 0 | 0 | 0 | 0 | 0 |
| Unvoiced | 1 | 0 | 0 | 0 | 0 | 0 | 0 | 0 |

| SET UP | S | E | T | - | U | P | | |
|---|---|---|---|---|---|---|---|---|
| Voiced | 0 | 1 | 0 | 0 | 1 | 0 | 0 | 0 |
| Unvoiced | 1 | 0 | 1 | 0 | 0 | 1 | 0 | 0 |

| CONTINUE | C | ON | - | T | INU | (E) | | |
|---|---|---|---|---|---|---|---|---|
| Voiced | 0 | 1 | 0 | 0 | 1 | 0 | 0 | 0 |
| Unvoiced | 1 | 0 | 0 | 1 | 0 | 0 | 0 | 0 |

| RESET | RE | S | E | T | | | | |
|---|---|---|---|---|---|---|---|---|
| Voiced | 1 | 0 | 1 | 0 | 0 | 0 | 0 | 0 |
| Unvoiced | 0 | 1 | 0 | 1 | 0 | 0 | 0 | 0 |

| RESE(T) | RE | S | E | (T) | | | | |
|---|---|---|---|---|---|---|---|---|
| Voiced | 1 | 0 | 1 | 0 | 0 | 0 | 0 | 0 |
| Unvoiced | 0 | 1 | 0 | 0 | 0 | 0 | 0 | 0 |

| RES-E(T) | RE | S | - | E | (T) | | | |
|---|---|---|---|---|---|---|---|---|
| Voiced | 1 | 0 | 0 | 1 | 0 | 0 | 0 | 0 |
| Unvoiced | 0 | 1 | 0 | 0 | 0 | 0 | 0 | 0 |

Figure 10

Attention commands:

| START PROCESS | ST | AR | T | - | PRO | C | E | SS |
|---|---|---|---|---|---|---|---|---|
| Voiced | 0 | 1 | 0 | 0 | 1 | 0 | 1 | 0 |
| Unvoiced | 1 | 0 | 1 | 0 | 0 | 1 | 0 | 1 |

| END PROCESS | END | - | PRO | C | E | SS | | |
|---|---|---|---|---|---|---|---|---|
| Voiced | 1 | 0 | 1 | 0 | 1 | 0 | 0 | 0 |
| Unvoiced | 0 | 0 | 0 | 1 | 0 | 1 | 0 | 0 |

Templates:

| OPEN SWITCH | O | P | EN | - | S | WI | TCH | |
|---|---|---|---|---|---|---|---|---|
| Voiced | 1 | 0 | 1 | 0 | 0 | 1 | 0 | 0 |
| Unvoiced | 0 | 1 | 0 | 0 | 1 | 0 | 1 | 0 |

| PULSER | P | UL | S | ER | | | | |
|---|---|---|---|---|---|---|---|---|
| Voiced | 0 | 1 | 0 | 1 | 0 | 0 | 0 | 0 |
| Unvoiced | 1 | 0 | 1 | 0 | 0 | 0 | 0 | 0 |

| TURN OFF | T | URN | - | O | FF | | | |
|---|---|---|---|---|---|---|---|---|
| Voiced | 0 | 1 | 0 | 1 | 0 | 0 | 0 | 0 |
| Unvoiced | 1 | 0 | 0 | 0 | 1 | 0 | 0 | 0 |

| TURN ON | T | URN | - | ON | | | | |
|---|---|---|---|---|---|---|---|---|
| Voiced | 0 | 1 | 0 | 1 | 0 | 0 | 0 | 0 |
| Unvoiced | 1 | 0 | 0 | 0 | 0 | 0 | 0 | 0 |

| BACK UP | BA | CK | - | U | P | | | |
|---|---|---|---|---|---|---|---|---|
| Voiced | 1 | 0 | 0 | 1 | 0 | 0 | 0 | 0 |
| Unvoiced | 0 | 1 | 0 | 0 | 1 | 0 | 0 | 0 |

IDENTIFYING SPOKEN COMMANDS BY TEMPLATES OF ORDERED VOICED AND UNVOICED SOUND INTERVALS

FIELD OF THE INVENTION

The invention relates to voice-activation technology, and particularly to means for recognizing a spoken command by detecting time intervals containing voiced and unvoiced sound.

BACKGROUND OF THE INVENTION

Voice-activation technology is a rapidly evolving field. Fascinating applications appear almost daily. Prior art in this field is primarily directed toward the interpretation of free-form speech such as dictation and general questions. Most of the emerging applications, however, involve relatively simple devices that perform just a few specific operations. Desirable products that could be fully operated with a few predetermined commands include consumer devices (games, hobby devices, counters and timers, kitchen gadgets, home automation, exercise and sporting applications, toys, learning aids, products for the disabled), industrial systems (hands-free system interfaces, security monitoring, semi-autonomous machining and assembly, devices for rapid counting/sorting/stamping, electronic test and measurement), as well as devices for office, retail, and scientific applications, among many others. Unfortunately, the prior art serves these applications poorly. What is needed is a simple method to recognize a small number of spoken commands, preferably involving minimal software and very low-cost parts.

A patent, U.S. Pat. No. 7,532,038 to Ariav, attempts to resolve this problem by separating the command sounds into two frequency bands using high-pass and low-pass filters. Three commands "Yes", "No", and "Stop" are identified. Unfortunately, many commands that consumers expect to use cannot be discriminated on frequency alone, and many command words include brief phonemes for which frequency analysis is ambiguous at best. Consumers are sensitive about their user interface, and do not gladly tolerate awkward commands or arbitrary limitations.

Nearly all prior sound-processing methods operate in the frequency domain, yet sound is transmitted exclusively in the time domain. Converting the sound signal to a frequency spectrum is slower and more expensive than processing the sound as it arrives, in real-time. For example, the dual-band-pass system of Ariav requires multiple gain stages with multiple filter components, and then the low- and high-frequency channels must be digitized separately, all of which increases board cost and software complexity. Perhaps one could digitize an unfiltered signal instead, and then use Fourier analysis to separate the two frequency components; but this would require a greatly expanded processor and memory, negating any savings. Moreover, key features of the sound wave are lost in a conventional FFT because it displaces phase information. The frequency domain is a valid representation of sound only with complex-number or vector Fourier transformation, requiring even larger processors and memories, with costs that more than offset any other savings. A vastly simpler and more versatile approach would be to analyze commands in the time domain by recognizing sound intervals of different types as they occur.

Recent advances in psychology provide useful guidance for voice-command processing. Humans have an amazing ability to focus on one conversation while ignoring other background conversations of equal or greater loudness. This is called selective attention, or informally, the Cocktail-Party effect. Selective attention is basically a signal-processing strategy, not unlike the challenge of picking out a valid voice command from among background noises and non-command speech. Another interesting phenomenon, called attention breakthrough, is the involuntary reaction that occurs when someone calls your name unexpectedly. Your attention is irresistibly diverted by this one particular signal, even while focusing on some other conversation. Possibly these techniques, which have been honed over thousands of years of human evolution, can assist in command identification.

What is needed is voice-activation means for controlling a device involving few predetermined commands and few responsive actions. Preferably the new technology would include simple, compact algorithms to discriminate command sounds, would rapidly recognize a valid command, and would ignore all other sounds. Possibly the new technology would exploit advanced signal processing techniques analogous to those used instinctively by the human brain. Robust, low-cost identification of valid commands would then enable a host of valuable new consumer and industrial applications.

BRIEF SUMMARY OF THE INVENTION

The invention is a method to recognize a spoken command comprising voiced and unvoiced sound intervals in a particular order, and to responsively select one action from a plurality of predetermined actions, responsive to the spoken command. First, the sounds of the spoken command are converted to an analog electronic signal which is then digitized, or measured periodically, producing a set of digital measurements representing the sound. The digitized signal is then analyzed to detect fast and slow signal variations, which are then analyzed to identify intervals of unvoiced and voiced sound. Then a command sequence is prepared, indicating the order and type of all the sound intervals in the command. The command sequence is then compared to templates that indicate the order of voiced and unvoiced intervals in all acceptable commands of the application. Each template is associated with a predetermined action. When the command sequence matches one of the templates, the predetermined action associated with the matched template is thus selected.

The inventive spoken command is any utterance by any user. The spoken command may be a word or phrase or short sentence in any language, or even nonsense, so long as it contains at least one voiced or unvoiced sound interval. Typically the command is spoken for the purpose of controlling a device or obtaining a response from an application. The instant invention is appropriate for any application that involves only a small number of predetermined responsive actions and a small number of predetermined acceptable commands.

A voiced sound is any sound generated by vocal cord action, such as the sound of the letters "A" or "M" or "D" as commonly pronounced. An unvoiced sound is any sound generated by restricting an air passage, but without vocal cord involvement, such as the sound of "S" or "T" or "P". A voiced interval is an interval of time containing primarily voiced sound, and an unvoiced interval is an interval of time containing primarily unvoiced sound. Every sound interval is preceded and followed by silence or by the opposite type of sound.

The invention includes producing a sound signal that represents the sound versus time. First, the sound is converted into an analog electronic signal which is a time-domain voltage waveform, usually comprising the amplified output of a microphone or other sound transducer. The electronic signal is then digitized by periodically measuring the electronic signal, using an ADC (analog-to-digital converter) or other converter, to produce sequential digital measurements comprising the digital signal. The sound signal comprises either the analog electronic signal or the digitized signal, both of which represent the sound of the spoken command versus time.

Typically the digital measurements are made periodically, with Tdig being the measurement period, or the time between successive measurements. Preferably Tdig is approximately equal to the shortest time over which the signal changes or varies. Tdig is typically in the range of about 0.02 to 0.15 millisecond, which is comparable to the fastest variations in most speech sounds. If the ADC operates faster than the preferred rate, then a portion of the measurements may be averaged or ignored or analyzed separately, so as to obtain a digitized signal with a periodicity in the preferred range. If the ADC operates at twice the preferred rate, then the measurements can be separated into two interleaved measurement sets can be obtained, each set having a measurement period in the preferred range but 90 degrees out of phase with each other. An advantage of having two interleaved measurement sets is enhanced sensitivity, since any signal variation that is missed by one of the sets will be detectable in the other set. If, on the other hand, the ADC is too slow to maintain the desired measurement periodicity, the inventive method will still work, but the unvoiced sound sensitivity will be compromised.

The invention includes analyzing the digitized signal to detect fast and slow signal variations therein. A signal variation is any change in the sound signal. A fast signal variation, or simply a fast variation, is a change of the sound signal that occurs over a time shorter than a particular time Tfs, while a slow signal variation is a change in the sound signal that occurs in a time longer than Tfs. For optimal discrimination between voiced and unvoiced sounds, Tfs is preferably in the range of about 0.1 to about 0.5 millisecond. When Tfs is set in the preferred range, slow variations are strongly correlated with voiced sound, while fast variations are strongly correlated with unvoiced sound. Detecting fast and slow variations in the sound signal thus reveals the voiced or unvoiced type of each sound in the spoken command.

As used herein, a signal variation corresponds roughly to an individual sound wave or a portion of a sound wave, whereas a sound interval corresponds to an audible period of sound such as a phoneme or a syllable of the command. A signal variation typically occurs over a time of 0.01 millisecond to 3 milliseconds, whereas a sound interval is typically tens to hundreds of milliseconds in duration. Each sound interval typically includes hundreds or thousands of signal variations, most or all of the variations in one sound interval being of the same type.

The inventive method of determining sound type by detecting fast and slow signal variations is an important advance over the conventional frequency-based techniques used in prior art speech interpretation. First, the key features of the sound wave that discriminate voiced and unvoiced sound are rate-of-change events. When converted to the frequency domain, these features unavoidably map to a wide range of possible frequencies. Due to this imprecision, techniques based on frequency tend to perform poorly in sound-type discrimination. Second, real speech waveforms are often non-sinusoidal and are almost never reproducible, even on a short time scale. While a full complex transformation can recover the waveform correctly, each spoken command includes thousands of signal variations, so that a full representation in frequency space requires a substantial processor and memory while providing no benefit in sound-type recognition. The time-domain signal itself contains all obtainable information about the sound type. The fast-slow variation analysis is a better way, and is believed to be the most compact and economical way, to exploit that information for sound-type determination.

Slow signal variations are detected by any analysis means that correlates with voiced sound and not with unvoiced sound. For example, the slow variations may be detected by additively combining successive measurements of the digital signal to derive an integrated signal, and then comparing the integrated signal to a slow-variation threshold. "Additively combining" means adding or averaging a number of sequential measurement values of the digitized signal. The integrated signal may simply be the average of Nav successive sound measurements, Nav being some integer. Or, the digitized values may be multiplied by a weighting function before averaging.

The integrated signal may be silence-corrected by subtracting a value Vsilence that represents the digitized value during silence. Vsilence may be subtracted from the average, or from each of the Nav digital measurements before averaging. In either case the result is a silence-corrected average. Advantages of subtracting Vsilence are that any biasing or offsets are eliminated, so that the silence-corrected average has a mean of zero. After subtracting the Vsilence value, the magnitude of the silence-corrected average may then be taken, which makes threshold comparisons simpler to perform, since then only one threshold need be used. Taking the magnitude also simplifies any further smoothing, if needed. The integrated signal is the final result of additively combining successive digital measurements, which includes the Nav averaging, optional Vsilence subtraction, optional weighting, optional magnitude taking, and optional smoothing.

The integrated signal is then compared to a slow-variation threshold value. A slow variation of the signal is detected when the integrated signal exceeds that threshold. Preferably the slow-variation threshold is set high enough to reject noise, yet low enough to detect a softly spoken voiced sound. The number Nay of averaged measurements depends on the digitization period Tdig. Preferably the product Nav*Tdig is longer than most of the signal variations in unvoiced speech, yet shorter than the signal variations in voiced speech. Increasing Nay improves the rejection of unvoiced sounds, but may also exclude some of the desired voiced sound. Preferably Nav*Tdig is in the range of 0.3 to 2.0 milliseconds.

The invention also includes means for detecting fast variations in the digitized signal by subtractively combining sequential measurements. "Subtractively combining" means calculating differences between sequential digitized measurements according to a discrete differential formula. A discrete differential as used herein involves a series of sequential digital measurements labeled V1, V2, and so forth, wherein the sequential measurements are alternately added and subtracted, as in the formula V1−V2+V3−V4. When subtractively combining an odd number of measurements, the first and last measurements should be divided by 2, to balance the positive and negative contributions. Balancing the positive and negative contributions avoids an unwanted amplitude sensitivity. There is no need to subtract Vsilence. Optionally, the measurements may be multiplied by a weighting function.

The differentiated signal is compared to two threshold values, representing upward and downward fluctuations of the signal. Or, the magnitude of the discrete differential may be calculated first, and then compared to a single threshold. The magnitude of the discrete differential may also be smoothed or averaged across a time Tsmooth, thereby improving sensitivity and rejecting pulsatile noise. The differentiated signal is the result of the subtractively-combining step, which includes calculating the discrete differential, optional weighting, optional magnitude taking, and optional smoothing or averaging. The differentiated signal is then compared to a fast-variation threshold, a fast variation being detected when the differentiated signal exceeds that threshold.

The inventive analysis enables the detection of fast and slow signal variations in real time, thereby enabling near-instantaneous determination of the sound type during each sound of a command. The inventive analysis evaluates the sound type with a speed unmatched by any frequency-binning technique, Fourier technique, or statistical parsing technique. Also, the inventive analysis is cheaper to implement, since minimal hardware is sufficient, and particularly since cumbersome analog electronics is avoided. The software to identify fast and slow variations is just a few lines of code, executable on a simple 8-bit microcontroller.

Another advantage of the inventive analysis using fast and slow signal variations, is that it greatly reduces the gender dependence of voiced sound discrimination. The frequency of male and female voiced speech exhibits a strong gender dependence, which complicates any speech recognition based on frequency. However, male sounds have a distinctly non-sinusoidal waveform, quite different from typical female voice waveforms that tend to be more uniform. Due to this non-sinusoidal effect, the range of signal variations in male voiced speech is similar to the range in voiced female speech, despite the male sounds having lower frequencies overall. By selecting ranges for the variation time parameters, the inventive method reduces the unwanted gender effect, simplifying the detection of voiced sound. A related advantage is that the detection of signal variations in the time domain can reliably analyze single-sided features which are often seen in male speech waveforms. Frequency-domain methods tend to perform poorly with single-sided sound pulses and other non-sinusoidal and non-repeating waveforms, whereas the inventive method processes these same patterns with high reliability.

The invention includes an interval-detection protocol to identify all the voiced and unvoiced sound intervals in the command. Each sound interval is bounded by periods of silence or by sound of the opposite type. To identify each sound interval, the type of sound—voiced or unvoiced—must be determined by analyzing fast and slow variations in the sound signal. The starting and ending times of the sound interval may also be noted, for improved command recognition. Also, silent periods should occur before and after every command, to indicate when the command starts and ends. For example the command GO has one voiced interval preceded and followed by silence. The command SIX has an unvoiced S, then a voiced I, then an unvoiced X; hence the voiced interval for 1 is preceded and followed by opposite-type unvoiced intervals. The command RESET includes a voiced interval for RE, an unvoiced S, a voiced E, and then an unvoiced T sound.

The interval-detection protocol is any set of rules for analyzing the fast and slow signal variations to identifying the sound intervals in the command, as well as their voiced or unvoiced types, and preferably determining the interval starting and ending times as well. Four examples of interval-detection protocols are provided. First, a simple interval-detection protocol will be discussed although it is not the preferred choice. The simplest interval-detection protocol has just one rule: each interval must have only one type of signal variation therein. Using this protocol, a voiced interval begins as soon as a slow variation is detected, and ends as soon as a fast variation is detected, or upon the end of the command. An unvoiced interval begins when a fast variation is detected and ends with a slow variation being detected, or upon the end of the command. This first interval-detection protocol is difficult to use because it is intolerant of even momentary signal variations of the "wrong" type. In the complex and variable signal patterns of real speech, it is common for an isolated fast variation to occur in a voiced sound interval, or (less commonly) for an isolated slow variation to occur during unvoiced speech.

As a second and more robust interval-detection protocol, the sound intervals may be recognized only after a number of signal variations of the same type have been detected. Requiring that multiple same-type variations occur together improves the reliability of sound interval detection, and automatically rejects isolated opposite-type variations as noise. More specifically, a voiced interval may be recognized when a number NSvar slow variations are detected in succession, and an unvoiced interval is detected when NFvar fast variations occur in succession. NSvar and NFvar are integers, and may be the same number Nvar, or they may be different. Different detection requirements for voiced and unvoiced sound may be appropriate, such as when voiced sounds are louder than unvoiced; hence it may be preferable to set NSvar somewhat higher than NFvar, so as to obtain similar overall sensitivity to voiced and unvoiced sounds. Preferably NSvar and NFvar are set high enough that each sound interval is correctly identified, but not so high that a brief command sound is missed. Typically NFvar and NSvar are in the range of 2 to 100. If NSvar and NFvar are set to 1, this protocol reduces to the first interval-detection protocol discussed.

As a third interval-detection protocol example, the rate of arrival of fast or slow variations could be observed, and sound intervals could be recognized only when the detection rate is sufficiently high. The rate of occurrence of signal variations can be determined by keeping track of when each variation is detected, but this would require a lot of computer attention to track each of the numerous signal variations individually. A tidier surrogate for the detection rate is time-binning, wherein the number of signal variation detections occurring in each "bin" or time period is counted. Each bin count is then recorded in a set of Nbuf memory elements, often called a circular buffer, holding the most recent Nbuf counts. Two buffers are used to count fast and slow variations. The two buffers may have different bin widths and different number of elements. The total of all the counts in each buffer is then compared to buffer thresholds to detect the sound intervals.

A fourth, and preferred, interval-detection protocol is a tally counter. A tally counter is a memory element or a computer register that can be incremented and decremented. Two tally counters are used, one to count slow variations for voiced interval detection, and one to count fast variations for unvoiced interval detection. The voiced tally counter is incremented each time a slow variation is detected, and is decremented periodically (such as once per millisecond). The unvoiced tally counter is incremented each time a fast variation is detected, and is decremented periodically. A voiced interval is recognized when the voiced tally count rises above a voiced tally threshold, and ends when the count falls below that threshold. An unvoiced interval is detected in like fashion using the unvoiced tally counter. The tally method of interval detection is a fast, compact event-rate detector, while providing a high level of flexibility regarding thresholds and logic, but with minimal hardware and software.

Preferably the tally decrementation period is short enough to allow the tally to respond promptly to changing command sounds, but long enough to avoid confusion due to the natural variation in sounds during spoken commands. Typically the tally decrementation period is in the range 0.3 to 3 milliseconds.

Preferably the tally counters are never decremented below zero, since a negative count would not be meaningful. Also, the tally counters may be limited to a maximum value in order to keep the tally recovery time short. The recovery time equals the decrementation period times the difference between the maximum count and the tally threshold. For example, if the decrementation period is once per millisecond, and the maximum tally count is 50, and the tally threshold is 20, the recovery time is 50–20=30 milliseconds. Preferably the recovery time is shorter than the shortest anticipated silent interval to be detected.

Normally the tally counters are incremented by adding 1, and decremented by subtracting 1. Alternatively, the tally counters could be incremented by adding some other number, and could be decremented by subtracting yet another number. The voiced and unvoiced tally counters could have different incrementation and decrementation values, perhaps to compensate different channel characteristics. As a further alternative, the decrementation could be performed conditionally, for example by decrementing a tally counter whenever a signal variation of the opposite type is detected. Likewise the decrementation could be inhibited while signal variations of the same type are occurring at a sufficient rate. In practice, however, the options listed in this paragraph result in little performance gain. Therefore the preferred method is simply to increment each tally by 1 when a same-type variation is detected, and then decrement both tallies by 1 periodically without condition.

The invention includes two quite different types of thresholds. For detecting the fast and slow variations, the integrated and differentiated signals are compared to the slow- and fast-variation thresholds, which are digitized voltage values. Tally counters and time-binning buffers, on the other hand, are integer count values, and so the thresholds for detecting sound intervals by tally count or time-binning are also integer count values. To avoid confusion, all threshold references hereinafter will indicate explicitly whether the threshold refers to a signal variation or a tally count.

The invention includes an overlap rule in case of an overlap, wherein a voiced interval and unvoiced interval both occur at the same time. The overlap rule could specify that the interval that starts first is allowed to continue, and the intruding interval would be recognized only when the first interval ends. Or, both the voiced and unvoiced intervals may be recognized simultaneously, in which case the command sequence must record the fact that the intervals overlap. Or, one type of sound type may be given priority in any conflict situation. Or, the command may be simply discarded as ambiguous.

The preferred interval-detection protocol will depend on the likelihood that an opposite-type signal variation may occur during an interval of sound. For most commands and most variation-detection threshold settings, it is more common for a few fast variations to occur during voiced speech, than for slow variations to occur during unvoiced speech. Therefore the best recognition is often obtained with a protocol that favors the voiced intervals over the unvoiced in any overlap. Alternatively, the protocol could avoid all such conflicts by preventing fast variations from being detected while a voiced interval is in progress. It may be counter-intuitive that the best command recognition is obtained by favoring the noisier channel (voiced sound) over the cleaner channel (unvoiced). But this is explained by the fact that the cleaner channel rarely experiences an opposite-type variation, and thus is accurately detected even without getting favorable treatment from the interval-detection protocol.

The invention includes channel hysteresis, a signal processing technique for enhancing the sensitivity of a signal channel when there is already activity on that channel. Typically channel hysteresis involves a variable threshold value, such as a signal variation threshold or a tally threshold. As an example of channel hysteresis involving the signal variation thresholds, the slow-variation threshold could be lowered when a voiced interval is present, and then raised when the voiced interval ends, thereby enhancing the sensitivity to voiced sounds whenever a voiced sound interval is already ongoing. Likewise the fast-variation detection threshold could be set to a lower value while an unvoiced interval is ongoing, and set to an upper value, higher than the lower value, when the unvoiced interval ends. Thus channel hysteresis provides that an already established signal (the ongoing sound interval) increases the sensitivity to that same type of signal (the same-type sound variations). Channel hysteresis makes it is harder to initially detect an interval of sound, due to the high initial threshold. But as soon as a sound interval is recognized and ongoing, the sound interval is easier to sustain due to the lowered threshold thereafter. Channel hysteresis results in improved stability and simpler interval-detection processes.

A second example of channel hysteresis involves the tally thresholds (or other interval-detection thresholds). The voiced tally threshold, for example, is initially set to an upper value. A voiced interval is recognized only when the voiced tally count exceeds this upper value. But as soon as a voiced interval has been detected, the voiced tally threshold is set to a lower value, and remains at the lower value until the voiced tally count finally drops below the lower value. When the voiced tally counter drops below the lower threshold value, at that time the voiced interval has ended, and the voiced tally threshold is again set to the upper value. Thus with the tally version of channel hysteresis, a voiced interval begins when the voiced tally count rises above the upper value, and then ends when the voiced tally count drops below the lower value. A similar channel hysteresis can be arranged regarding the unvoiced tally counter by changing the unvoiced tally threshold when there is an unvoiced interval present. In each case, the sensitivity to one type of sound is enhanced while that sound type is ongoing.

Channel hysteresis may include adjusting both the variation detection threshold and the tally threshold simultaneously. In that case, the variation threshold and the tally threshold are both lowered when the same-type sound interval is present, and both are raised when the same-type sound interval ends.

Channel hysteresis may be applied to the voiced and unvoiced channels equally, or to the voiced or unvoiced channels asymmetrically. In asymmetric channel hysteresis, a small threshold change may be applied to the voiced channel and a larger threshold change to the unvoiced channel, for example. Such asymmetric hysteresis is useful to compensate channel-dependent noise, interference, or amplitude differences.

The invention also includes cross-channel suppression, wherein a threshold is raised when the opposite channel has activity. Cross-channel suppression enables the suppression of one channel (the voiced sound, for example) while the opposite channel (unvoiced) is active. This tends to protect against episodic noise and other non-command inputs. Cross-channel suppression can be implemented by raising either a signal variation threshold or a tally threshold, or both. For example, the slow-variation threshold can be raised when an unvoiced interval is present, and the fast-variation threshold can be raised when a voiced interval is present, thereby reducing sensitivity to any opposite-type background sounds. Likewise, the voiced tally threshold may be raised when an unvoiced interval is present, and the unvoiced tally threshold may be raised when a voiced interval is present. In both the variation threshold version and the tally threshold version, the presence of one type of sound reduces sensitivity to the other type of sound.

An advantage of cross-channel suppression is that it prevents one channel from "barging in" while the other channel is already active. It also reduces the possibility of overlap intervals. It also allows the stronger signal channel to prevail, thereby enhancing command recognition. Importantly, when implemented as described, there is no loss of sensitivity to sounds (unless, of course, the competing channel is active first). High sensitivity is a valuable feature when detecting fainter command sounds.

Absolute cross-channel suppression is another option, wherein one type of signal is totally inhibited whenever the other type of signal is present. For example, the detection of fast variations may be prevented while a voiced interval is present, thereby totally shutting down any input from unvoiced sounds until the voiced interval is finished. Absolute inhibition may be arranged symmetrically, wherein voiced sounds are inhibited while an unvoiced interval is present, and unvoiced sounds are inhibited while a voiced interval is present. Or, the inhibition may be asymmetrical with one channel being given priority over the other. Asymmetric absolute cross-channel suppression is advantageous when one type of sound tends to generate more false signals than the other. For example, voiced sounds sometimes produce fast-variation detections if the sound is spoken too loudly, or for other transitory causes. Unvoiced sound, on the other hand rarely produces slow-variation detection because unvoiced sound signals tend to return to a neutral baseline in a time short compared to the slow variation time scale. The protocol could exploit this by specifying that a slow variation is always recognized, whereas an unvoiced sound is recognized only in the absence of voiced sound.

The invention includes detecting silent intervals as well as sound intervals. Silent intervals include pre-command silence, post-command silence, and interior silences which occur within a spoken command. Interior silences may be further classified as brief or sustained depending on duration. A silent interval is detected according to a silence-detection rule. Three versions of the silence-detection rule are: (1) A silent interval is any interval that is not a voiced or unvoiced interval, or (2) A silent interval is any interval that does not have fast or slow variations detected in it, or (3) A silent interval is any interval wherein the sound signal does not exceed a voltage threshold. Different silence-detection rules may be used for detecting silent intervals at different times. For detecting interior silent intervals, version 1 (no sounded intervals present) is preferred because version 1 tolerates a few occasional signal variations that may occur during the silent interval but are not sufficient to interrupt the silent interval. This is particularly valuable since, in real command speech, the interior silences are often not totally silent, and may include residual small-amplitude sound which may cause occasional fast or slow variation detections. Thus version 1 provides the most robust detection of internal silent intervals because it tolerates such detections as long as they do not rise to the level of the tally threshold for sound interval detection. To detect the pre- and post-command silences, on the other hand, higher sensitivity is desired. Version 2 (no variations) and 3 (no signal excursions) provide high sensitivity since they respond to any detectable sound, rather than waiting for a sound interval to be detected. Therefore version 2 or 3 would be preferred for detecting the pre- and post-command silences.

The requirement that a pre-command silent interval occur, before accepting any command sounds, ensures that prior commands and background noises have finished. The required duration of the pre-command silence may be termed Tinitial. The Tinitial time period is demarked before any commands are accepted, and if any sound is detected before Tinitial has passed, then it is started over. Likewise, a post-command silent period, of duration Tfinal, must occur after the command ends, and likewise the expiration of Tfinal indicates that the command has finished. The initial and final silent times can be detected by starting a preprogrammed, retriggerable timer such as a clock counter or a capacitive discharge timer with a predetermined duration. If any sound is detected before the timer expires, the timer is again re-started with full preset duration. The silent requirement is satisfied when the timer finally expires with no further sound detected. Preferably Tinitial is long enough to catch any remaining prior sounds, but not so long that the user must wait needlessly for the application to get ready. Typically Tinitial is in the range 100 to 1000 milliseconds. Preferably Tfinal is longer than the longest silent interval within any command, but not so long that the user experiences an annoying delay before the responsive action. Typically Tfinal is in the range of 100 to 500 milliseconds.

Silent intervals occurring interior to a command are preceded and followed by sound intervals. Silent intervals may be included in the command sequence and templates for improved command recognition, so long as the users reliably include that silent interval when speaking the command. Some silences, particularly brief silences, are highly variable and speaker-dependent. Brief silences may be detected and used (carefully) to enhance the command analysis, but they should not be relied upon for command recognition. If it is comfortable for users to say a command two different ways, they will.

Sustained interior silences often occur in commands that have two sounded intervals of the same type, separated by a gap. For example, the command GO DOWN has two voiced intervals (GO and DOWN) with a silent interval between (the interval between the two word sounds). Likewise the command BOX TWO includes two unvoiced intervals (the X and the T) separated by a silent interval. Since these commands are difficult to say without the silence, the silent interval can be relied upon for command recognition.

A brief interior silence may occur in a variety of speech situations. For example, when a plosive unvoiced consonant such as T, K, or P is pronounced, the air passage is first blocked by the lips, tongue, or glottis and then the air is released while the air is still under pressure from the lungs and diaphragm. A brief silence, which may be termed a pre-plosive silence, occurs while the air passage is blocked, and then the unvoiced sound is generated when the compressed air is released. In contrast, voiced consonants such as D, B, and hard-G do not produce silent intervals because the vocal cords continue to generate sound throughout the pronunciation of voiced sounds, even while the air passage is temporarily blocked. Therefore the pre-plosive silence occurs only for unvoiced consonants, and not for voiced consonants. Humans do not detect the pre-plosive silence specifically, however speech sounds strange if the silence is missing.

A second type of brief silence, termed a resonance delay, occurs when a voiced interval begins. The resonance delay is caused by the time required for the vocal cords to begin resonating. Resonance delays are commonly seen in all resonance phenomena including electronic, mechanical, acoustical, and other situations where energy is fed into a resonating system. For example in the word SEE, the unvoiced S sound gives way to the voiced EE sound, but a brief (few milliseconds) gap occurs between these two sounds due to the vocal cord resonance delay. In contrast, no such silence is observed when the preceding consonant is voiced, as in DEE, since the vocal cords are already oscillating when the EE portion begins. Humans are usually unaware of the resonance delay, since we automatically fill it in with the subsequent voiced sound.

Another type of silence occurs when a terminal consonant is unspoken, but is implied by the adjacent acoustical features. For example, the command RESET can be pronounced with the T explicitly sounded, or it can be spoken with the T left silent. In the latter case, the E sound abruptly ends, the abrupt termination of sound thereby serving as an implied consonant thereafter. Such a command may be symbolically represented as RESE(T). The abrupt termination of sound preceding the silent consonant is universally recognized as an implied plosive consonant by humans, but not by computers unless special provision is arranged. Whether the consonant is silent or sounded depends on whether the air blockage is released before or after the pressure is relaxed. If the blockage is released first, the plosive consonant is sounded by the rush of air through the opened blockage. But if the pressure is relaxed first and then the blockage is opened, there is no rush of air and no plosive sound.

Silent times are also useful for determining when intervals of sound and silence begin and end. A short time period Ta is demarked when the sound interval starts, and is then re-started whenever any sound is detected before Ta expires. When Ta expires with no further sound detected, the sound interval is known to have ended. The Ta period could be re-started when a fast or slow signal variation is detected, or when the sound signal exceeds a threshold, or upon any other measure of sound. Preferably Ta is chosen to be longer than any of the natural fluctuations that occur within a sound interval, but shorter than the silent gaps between sound intervals in a command. Typically Ta is in the range of 20 to 200 milliseconds.

The starting time of any silent interval is usually identified as the time when the last sound was detected, which is also the time when the Ta timer was last started. In that case the starting time of the silent interval is found by subtracting the timer duration from its expiration time. Alternatively, the starting time of a silent interval could be defined as the Ta timer expiration time, instead of the timer's last starting time, thereby causing the silent interval to appear to have a duration shorter by the amount Ta. Either method may be used as long as the command sequence and the templates are formed using the same assumptions.

The invention includes determining the duration of sound intervals and, optionally, of silent intervals in the command. The duration of a sound or silent interval is the time between the starting and ending times of the interval. The starting and ending times of a sound interval can be determined by detecting an opposite-type sound, or by detecting silence. The starting and ending times of a silent interval can be determined only by detecting sound, which may be voiced or unvoiced sound.

Another way to discriminate brief and sustained sound intervals makes use of the tally method. The sound interval begins when the tally rises above the tally threshold, and ends when the tally falls below the tally threshold. Thus the tally method automatically determines the starting and ending times of each sound interval as the threshold-crossing times.

Sometimes a sound is so brief that there are not enough variation detections to build the tally up to the tally threshold. It is advantageous to detect such brief sounds anyway, for improved command identification. To detect a brief command sound, the invention includes a lower tally threshold which is lower than an upper tally threshold. Normally for a regular non-brief sound interval, the tally count exceeds both the lower and upper tally thresholds. A brief sound, however, may exceed only the lower tally threshold but not the upper tally threshold. In that case the sound would be recognized as a brief sounded interval.

The command sequence may be assembled in real-time, each interval being appended to the command sequence as soon as the interval is detected. Or the command sequence may be prepared after the command is finished. Usually the command sequence is prepared by setting memory elements, such as locations in a computer memory. Each interval could be represented by a number, such as a 1 indicating a voiced sound, 2 an unvoiced sound, 3 a silence, and perhaps higher numbers indicating other information such as the duration of the intervals.

Another representation of the command sequence employs two 8-bit registers, one register being for voiced intervals, and a second register for unvoiced intervals, with each bit corresponding sequentially to each interval in the command. If the first interval is voiced, the first bit in the voiced register is set to a 1. If the first interval is unvoiced, the first bit in the unvoiced register is set to a 1. The rest of the bits are likewise set according to the type of sound in each sequential interval in the command, up to 8 total intervals. A silent interval is indicated by placing a 0 at the same bit position in both registers, thereby indicating that the particular interval had neither voiced nor unvoiced sound. An overlap interval would have a 1 in both registers at the same bit position. If additional intervals are needed to identify the acceptable commands, the method can be expanded to include two registers per sound type, thereby accepting up to 16 intervals in the command. It may be noted, however, that users don't like long commands. Short commands with a distinct sound order are strongly preferred.

As an example of a command sequence, the command SORT comprises an unvoiced S, then the voiced OR, and finally the unvoiced T, which may be abbreviated as unvoiced-voiced-unvoiced. In the bit representation, the first and third bits in the unvoiced register are 1, and the second bit in the voiced register is a 1, and the other bits are 0. The registers could be displayed as: Voiced (0100 0000) and Unvoiced (1010 0000). Alternatively, if interval 2 had been silent instead of voiced, then the second bit would be zero in both registers. If interval 2 had been an overlap, then the second bit would be a 1 in both registers. Many other representation schemes are possible, so long as they include information about the type and order of sound intervals, and possibly silent intervals, in the command and templates.

The invention includes comparing the command sequence to the templates. The comparison may be carried out by subtracting the command sequence from the template, in which case a zero result indicates a match. Or, when the intervals are represented as bits in a register, the exclusive-or operation may be used to compare the command sequence with the templates, with a zero result again indicating a match.

The invention includes selecting a predetermined action that is associated with a template, responsive to a match between the template and the command sequence. The predetermined action is any electronic or mechanical change or signal that can be selected in response to the spoken command. Selecting the action comprises determining that the action is the intent of the person speaking the command. Selecting may also include triggering or performing or activating or indicating or otherwise singling out the selected action from among a set of predetermined actions, consequent to the spoken command. A predetermined action may include displaying or transmitting information or signals, performing a computation such as incrementing a count or storing a number, or any other identifiable response to the command. A predetermined action may include changing one of the predetermined actions, such as changing the predetermined action associated with the matched template. For example an application may have two modes 1 and 2, and a command SWITCH that causes the application to alternate between the two modes. Then the predetermined action of the template matching the SWITCH command would change itself each time the command is received. More specifically, if the application starts in mode 1, the predetermined action of that template is: "change to mode 2, and then modify this predetermined action so that it will change back to mode 1 next time it is called". After the second call of the SWITCH command, the predetermined action becomes "change to mode 1, and then modify this predetermined action so that it will change back to mode 2 next time it is called". In this way the predetermined action of the matching template is self-modified upon each call, thereby causing the application mode to be alternated between modes 1 and 2.

The predetermined action could include changing the predetermined actions of the other templates. For example, a command to restore the system to its original factory settings would undo all previous changes to all of the templates. A predetermined action could also change one or more templates. For example the predetermined action of the command "FRANCAIS" could be to change all the other templates to those of French language commands, while the command "ENGLISH" could change the templates back to the English commands.

Typically the predetermined actions involve a programmed memory. The action is usually prepared or programmed before it is selected, so that the desired action can be initiated or performed as soon as it is selected. The number of predetermined actions may be the same as the number of acceptable commands, but it need not be so. For example, some commands can be pronounced two different ways, and so there could be two different templates corresponding to the two pronunciations, both pointing to the same action. Some commands may have no responsive action at all, for example if an application is supposed to ignore a particular command while in a holding mode. The responsive action may be a null action, which may mean doing nothing or continuing to wait for an enabling command. The invention may also provide a default action to be selected when the command sequence matches none of the templates. For example the predetermined action corresponding to an invalid command, that matches none of the templates, may be to produce some indication that informs the user that a bad command has been received. Or, the unmatched command may be simply ignored.

The invention includes a special enabling command, called an attention command, for enhanced user control and noise rejection. An attention command is a command that the user must call first, before any of the other commands. The other commands may be termed directive commands, since they direct the device to actually do something, as opposed to the attention command, which simply gets the device's attention. The user must say the attention command first, and then say one of the directive commands. If a directive command is spoken first, it is ignored. The attention command greatly reduces false triggering, even when there are background noises similar to the directive commands, because all such noise is ignored until the attention command is spoken.

Typically the attention command controls a parameter, termed the gate parameter, that can be set to enabling or disabling. Directive commands are ignored while the gate parameter is disabling, and are obeyed while the gate parameter is enabling. The gate parameter is set to enabling as soon as an attention command is received. Typically the gate parameter remains enabling only for a period of time Tgate. When Tgate expires, the gate parameter is automatically set to disabling and no further directive commands are allowed, until the attention command is again received. Thus the gate parameter is set to enabling when the attention command is received, and is set to disabling when Tgate expires. Preferably Tgate is long enough that the user has time to speak a directive command without rushing, but short enough that the gate parameter becomes disabling before any background noises are able to cause a false trigger. Typically Tgate is in the range 0.5 to 10 seconds.

The Tgate period may be re-started after each valid directive command. This would allow a user to issue a series of directive commands without having to repeat the attention command each time, a convenience in some applications. The gate parameter would then be set to disabling when Tgate expires, after the user has finished the series of directive commands.

Or, the Tgate period may be aborted and the gate parameter may be set to disabling when each directive command is received. This would ensure that only one directive command may be processed at a time, which is an essential security feature in some applications. In order to process a second directive command, the user would have to again issue the attention command.

The gate parameter may be disabled when an invalid command or background noise is received. This would reduce the possibility that music or background noise could cause a false trigger.

The gate parameter may also be arranged with no expiration time. In that case the gate parameter is enabled after an attention command, and then remains enabled indefinitely. This would allow a user to take as long as desired to issue a directive command. Then, the gate parameter may be disabled by a second call of the attention command, in which case the application is alternately enabling and disabling upon successive calls of the attention command. Or, the gate parameter may be enabled and disabled by two different commands, an enabling command and a disabling command. For example the enabling command could be ENABLE, after which all of the directive commands are operational, and the disabling command could be DISABLE, after which only the enabling command would be recognized.

Using the inventive method, a voice-activated application recognizes a spoken command as one of the predetermined acceptable commands, and then selects the associated predetermined action responsively. The inventive process for command identification is extremely rapid, user-friendly, and highly reliable so long as each of the acceptable commands has a distinct order of voiced and unvoiced sounds. The inventive method can be implemented with minimal software and extremely minimal hardware. The inventive method thereby enables a wide range of useful devices and applications, that would not otherwise be economically feasible using prior art such as frequency binning methods, statistical model methods, and all methods involving wireless links to remote supercomputers.

BRIEF DESCRIPTION OF THE FIGURES

FIG. 2 is a set of tables showing the command sequence from FIG. 1.

FIG. 6 is a set of tables showing templates including silent intervals.

FIG. 10 is a set of tables showing templates for enabling and disabling.

DETAILED DESCRIPTION OF INVENTION

Figure 1:
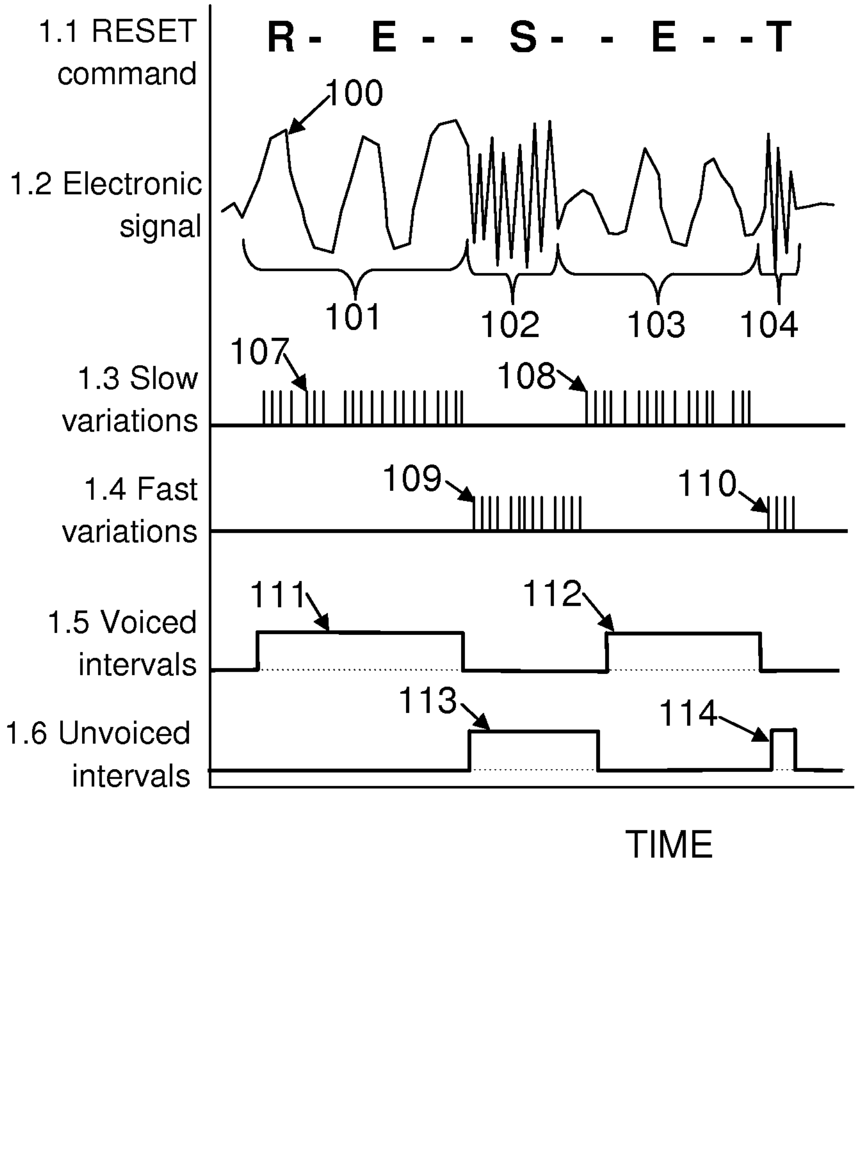
FIG. 1 is a set of graphs showing how a command is analyzed.

FIG. 1 shows graphs or traces, similar to oscilloscope traces, that display key signals related to command processing. These traces illustrate how the fast and slow variations in the sound signal are used to identify the voiced and unvoiced sound intervals in the command.

The first section, labeled "1.1 RESET command", shows the letters of the spoken command RESET, but spread out so that they correspond to the timing of the other traces. The RE portion of the command is a voiced sound, then the S portion is unvoiced, followed by the second E which is voiced, followed by the unvoiced T sound. To recognize the command, all four sound portions must be detected and the sound type of each interval must be identified.

The trace labeled "1.2 Electronic signal", shows an analog electronic signal 100 versus time. The electronic signal 100 is derived from the command sounds using a microphone and an amplifier without filtering. The electronic signal 100 includes four distinct sound regions indicated by braces. A first region 101, corresponding to the initial RE portion of the command, has slow variations characteristic of voiced sound. A second region 102 has fast variations corresponding to the unvoiced S portion of the command. A third region 103 has slow variations corresponding to the second E of the command, which is voiced. A fourth region 104 has fast variations corresponding to the unvoiced T sound. The electronic signal 100 as shown in FIG. 1 is very highly simplified, to illustrate the inventive principles. Also the time axis is not to scale. In real speech, the waveform is far more complex and variable, comprising thousands of non-repeating fluctuations of all sizes and shapes.

The invention includes analyzing the electronic signal 100 to detect fast and slow signal variations therein. The electronic signal 100 is first digitized or measured periodically, thereby producing a digitized signal comprising the set of measurements. For the example of FIG. 1, the digitization period is Tdig=0.06 milliseconds. Then, successive digitized measurements are additively combined to derive an integrated signal that emphasizes slow variations and suppresses fast variations of the electronic signal 100. Also, successive digitized measurements are subtractively combined to derive a differentiated signal that emphasizes fast variations and suppresses slow variations. The slow and fast variations are then detected by comparing the integrated signal and the differentiated signal to thresholds. The results are shown in the traces labeled "1.3 Slow variations" and "1.4 Fast variations", wherein slow variation marks 107 indicate the times when slow variations are detected during the region 101, and further slow variation marks 108 indicate when slow variations are detected during the region 103. Likewise, the fast variation marks 109 indicate when fast variations are detected during region 102, and further fast variation marks 110 indicate when fast variations are detected during region 104.

The integrated and differentiated signals comprise any calculation results, obtained from the digitized signal, that correlate with voiced and unvoiced speech respectively. In the example of FIG. 1, the integrated signal is obtained by averaging Nav successive digitized measurements, with Nav=16. The averaging tends to cancel out any signal variations shorter then Nav*Tdig=16*0.06=0.96 millisecond, and particularly to cancel out the fast variations. A slow variation is detected when the integrated signal exceeds a slow-variation threshold. Alternatively, two thresholds could be used for detecting slow variations, corresponding to upward and downward excursions of the integrated signal. A slow variation mark 107 or 108 is then placed on Trace 1.3 corresponding to each slow variation thus detected.

A differentiated signal is also derived, and is compared to a fast-variation threshold to detect the fast variations. In the example of FIG. 1, the differentiated signal is obtained according to a three-point discrete differential formula ((V1+V3)/2−V2), the numbered V's being sequential digitized measurements of the sound. The differential tends to cancel out any signal variations longer than 2*Tdig=0.12 millisecond, and particularly to suppress any slow variations. When the differentiated signal exceeds a fast-variation threshold, a fast variation is thus detected, and a fast variation mark 109 or 110 is placed on Trace 1.4. Two thresholds may also be used, so that upward and downward excursions of the differentiated signal could both be detected.

The invention includes identifying time intervals that have voiced and unvoiced sound. Accordingly, the traces labeled "1.5 Voiced intervals" and "1.6 Unvoiced intervals" show voiced intervals 111 and 112, and unvoiced intervals 113 and 114. The sound intervals are identified using any protocol that uses the detected fast variations 109 and 110, and slow variations 107 and 108, to identify the sound type of each interval. For the example of FIG. 1, each sound interval is simply that time region wherein signal variations of only one type are detected. Thus the interval 111 is that time interval wherein the slow variations 107 are detected, and the interval 111 is a voiced interval because the marks 107 are slow variation marks. The starting time of interval 107 is coincident with the first of the slow variations 107. The ending time of the interval 111 is coincident either with the last of the marks 107, or with the first of the fast variation marks 109, depending on software details. Likewise the interval 113 includes the fast variations 109 and thus is unvoiced, and the interval 112 includes the slow variations 108 and thus is voiced, and the interval 114 includes the fast variations 110 and thus is unvoiced.

The invention includes determining the command sequence from the detected sound intervals. On inspection of traces 1.5 and 1.6, it is apparent that four intervals are detected, and the order of the intervals is: first a voiced interval, then an unvoiced, then a voiced, and then an unvoiced interval.

As an alternative, the differentiated signal could be derived using another discrete differential formula. A 2-point differential is obtained by simply subtracting adjacent measurements, as given by the formula (V1−V2). A 4-point differential is (V1−V2+V3−V4), and similarly for 6-points and higher. If integer arithmetic is involved in the calculation, it may be safer to average the added values and the subtracted values separately, as in the formula ((V1+V3)/2−(V2+V4)/2). Dividing the intermediate values by 2 ensures that the output of the discrete differential has the same numerical span as the inputs, thus avoiding integer overflow. Odd-number differentials can also be used, provided that the first and last measurements are divided by 2, such as the 3-point differential formula ((V1+V3)/2−V2). A 5-point differential is (0.5*V1−V2+V3−V4+0.5*V5), or, safer, (((V1+V5)/2+V3)/2−(V2+V4)/2). Higher-number (or higher-order) differentials provide better rejection of slow variations, and in particular will reject loud voiced sounds that could overwhelm the simple 2-point differential. However higher differentials also restrict the range of fast variation times that are detected, which could reduce sensitivity to some fast variations. The 4-point version is an excellent compromise, providing instant detection of unvoiced sounds with little or no voiced crosstalk; however the 3-point and 5-point versions work almost as well.

FIG. 2 is a set of tables showing template and command sequences. In each table, a row labeled "Voiced" shows 8 bits, for example in a microcontroller register, representing up to 8 intervals in chronological order. A 1 is placed in each bit location of the Voiced row, where the corresponding interval is voiced, and a 0 otherwise. A row labeled "Unvoiced" shows a 1 when the corresponding interval has unvoiced sound.

The first table in FIG. 2, labeled "Command sequence from FIG. 1", shows the order of voiced and unvoiced intervals detected in the example of FIG. 1. That command sequence comprised a voiced interval, then unvoiced, then voiced, and then unvoiced. Accordingly, the command sequence shown at the top of FIG. 2 has a 1 in the first and third position of the Voiced row, corresponding to the intervals 111 and 112 of FIG. 1, and a 1 in the second and fourth positions of the Unvoiced row, corresponding to the intervals 113 and 114.

The command sequence shown at the top of FIG. 2 must be compared to each of the template sequences. There are four acceptable commands in the example of FIG. 2, specifically "SYSTEM", "START", "LEFT", and "RESET". A template is shown indicating the order of voiced and unvoiced intervals in each of these acceptable commands. The template for SYSTEM starts with the unvoiced S, followed by the voiced Y, then the unvoiced ST, and then the voiced EM. The START template is unvoiced-voiced-unvoiced. LEFT is voiced-unvoiced. RESET is voiced-unvoiced-voiced-unvoiced.

By comparing the detected command sequence with each of the templates, it is apparent that the command sequence of FIG. 1 matches the RESET template. Therefore the command of FIG. 1 is identified as a RESET command, and the responsive action associated with the RESET template is duly selected. This example demonstrates that the inventive method, using only the sound of a command, can accurately determine which responsive action is desired by the user.

Figure 3:
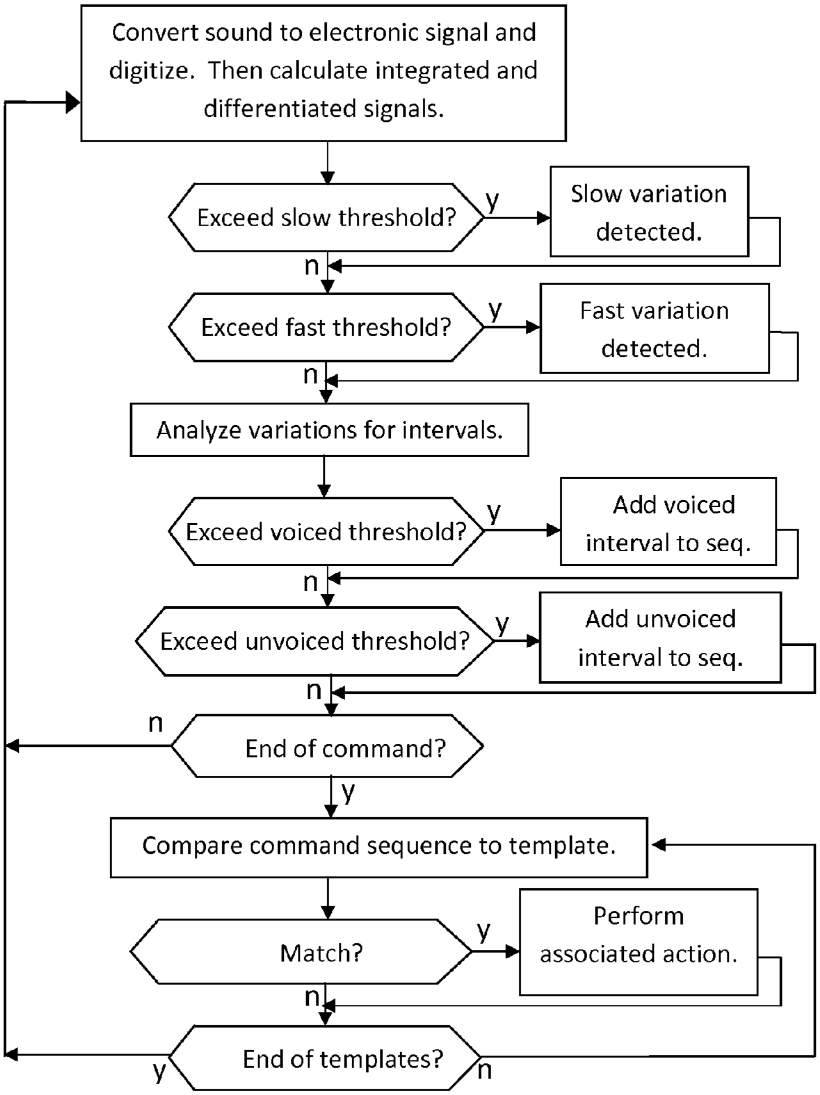
FIG. 3 is a flowchart showing how the command of FIG. 1 is processed.

FIG. 3 shows a flowchart according to the inventive method. First, sound from the spoken command is converted to an electronic signal, which is digitized, and the integrated and differentiated signals are calculated. Then, in the decision box labeled "Exceed slow threshold?", the integrated signal is compared to a slow-variation threshold, and a slow variation is detected when present. Likewise the fast-variation sounds are detected by comparing the differentiated signal to a fast-variation threshold in the decision box "Exceed fast threshold?".

Then, in the box labeled "Analyze variations for intervals", the detected slow and fast variations are analyzed to identify voiced and unvoiced sound intervals. The intervals are identified using an interval-detection protocol to determine a starting time and an ending time for each interval, and for ensuring that sound of primarily just one type exists in the interval. In the example of FIG. 3, the interval-detection protocol includes counting the number of same-type variations detected in succession, and then comparing that count to a threshold number. More specifically, the voiced interval threshold may be NSvar=5, and the unvoiced interval threshold may be NFvar=3. In each case, a sound interval begins when the requisite number of same-type variations are detected, and ends when an opposite-type interval begins, or at the end of the command.

The command sequence is built up bit-by-bit as each interval is identified. When each voiced or unvoiced interval is detected, an indicator is appended to the command sequence, in the boxes labeled "Add voiced interval to seq." and "Add unvoiced interval to seq.".

The end of the command is detected in the decision box labeled "End of command?". A command ends when a silent period of length Tfinal is observed. The Tfinal silent period may be detected by demarking the Tfinal period when the first command sound is detected, and then re-starting Tfinal upon each fast or slow variation detected. The Tfinal period is repeatedly re-started and does not expire as long as the command is in progress because the continuing sounds of the command cause the Tfinal period to be re-started, and this prevents Tfinal from expiring as long as sounds continue to occur. Then, after the command is ended, the sounds cease, and Tfinal expires with no further signal variations detected. In FIG. 3, if Tfinal has not yet expired, the decision box "End of command?" yields a No, and the method cycles back to detect more sound. If the command has ended, then the flow proceeds to the box "Compare command sequence to template".

The command sequence is then compared to one of the templates in the box "Compare command sequence to template". If there is a match, the associated responsive action is selected. The comparing step continues until all the templates have been tested. When the end of the templates has been reached, the flow again returns to the beginning, to receive the next command.

Implicit but not shown in the flowchart are steps to erase intermediate data, for example erasing the previous command sequence before starting the next command. Also, the flowchart indicates that the command sequence is compared to all of the templates, continuing even after a match has been found. Alternatively, the template comparisons could be aborted upon the first match, by having the "Perform associated action" box return to the beginning instead of continuing in the template cycle. Also, the flowchart shows the command sequence being assembled incrementally as each segment is recognized, but the command sequence could alternatively be produced after the command has ended. Also, the order of detecting the fast and slow variations is immaterial, and the order of identifying the voiced and unvoiced intervals is immaterial. As a further option, the command could be abandoned as unparseable as soon as the number of detected intervals in the command exceeds Nmax, the maximum number of intervals allowed, because it is pointless to continue analyzing a command if it has already exceeded the maximum number of intervals in all of the acceptable commands.

Figure 4:
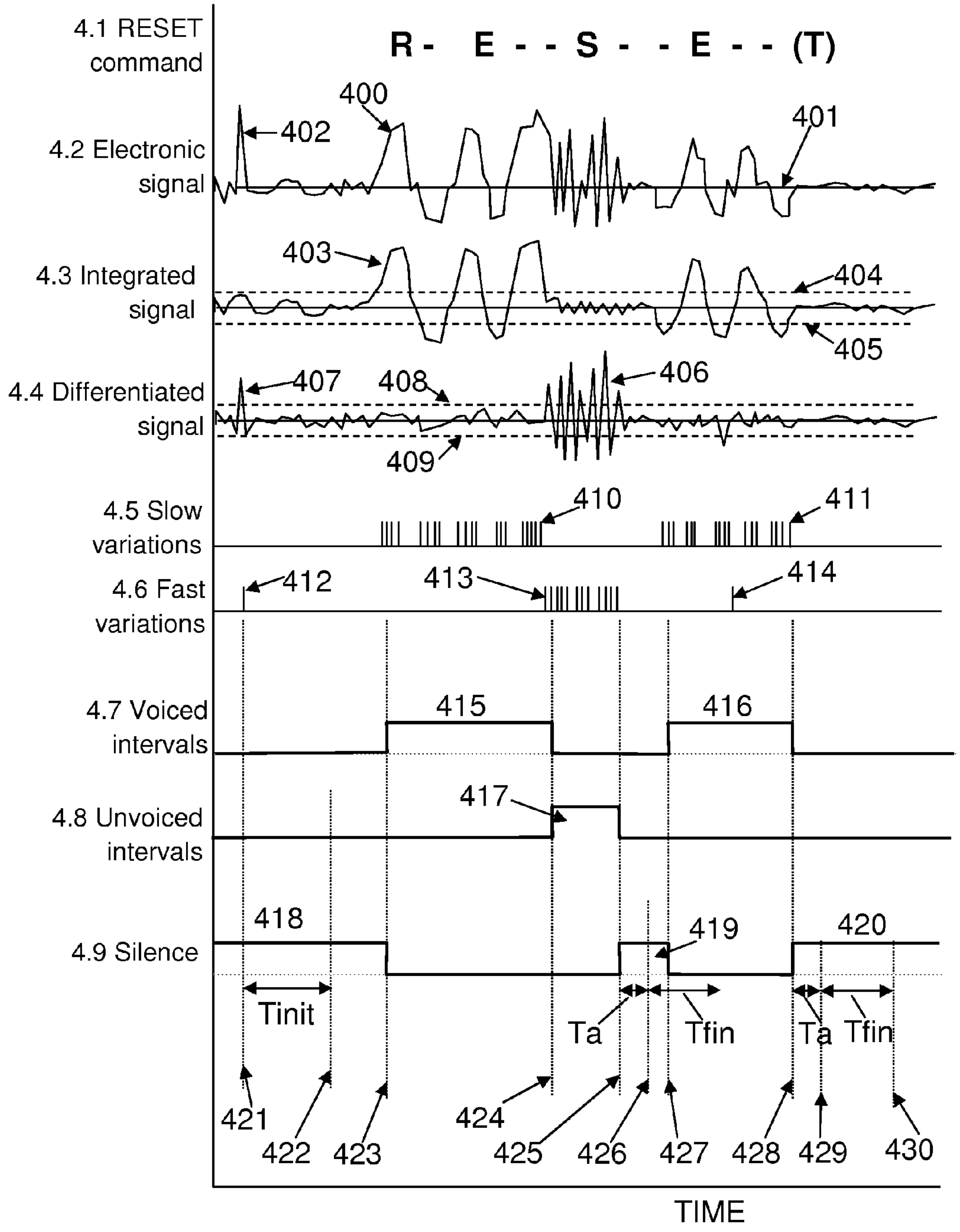
FIG. 4 is a set of graphs showing command analysis including silent intervals.

FIG. 4 shows traces of signals related to analyzing a RESET command. The example of FIG. 4 is similar to the example of FIG. 1 but includes further detail regarding sound analysis and time interval determination, and with silent intervals recognized in addition to the voiced and unvoiced intervals. Also, various times are indicated by vertical dotted lines.

The spoken command is spelled out in the section labeled “4.1 RESET command”, however in this case the T is not sounded. Instead, the sound stops abruptly at the end of the second E sound. This is a common way to pronounce the command. Indeed, users will not, as a rule, put forth the effort to laboriously pronounce commands in a particular way. The inventive method includes means for identifying the command whether or not the T is sounded.

The trace “4.2 Electronic signal” shows the electronic signal 400 derived from the sounds of the command, as well as a line 401 representing silence. The electronic signal 400 comprises voltage variations relative to the silent line 401, as well as a small amount of random noise. Also a noise pulse 402 occurs early. The voiced RE portion of the command exhibits slow variations, as does the second E portion, whereas the unvoiced S portion of the command shows fast variations. No detectable sound appears after the second E portion since the T is silent.

The electronic signal 400 is digitized by periodically measuring the voltage to form a digitized signal, and an integrated signal 403, shown in the trace “4.3 Integrated signal”, is derived by additively combining successive digitized measurements. The integrated signal 403 is obtained by averaging 16 successive digital measurements, and then subtracting a value Vsilence, the digitized value during silence. The integrated signal 403 emphasizes and somewhat smoothes the slow variations in the electronic signal 400, and particularly suppresses the fast variations. Also shown are an upper slow-variation threshold 404 and a lower slow-variation threshold 405 as dashed lines. Optionally the magnitude of the discrete differential may be calculated to simplify threshold comparisons and optional smoothing.

In the trace “4.4 Differentiated signal”, a differentiated signal 406 is shown. The differentiated signal 406 is derived by subtractively combining successive digitized measurements using a 4-point differential formula $(V1+V3)/2-(V2+V4)/2$. The differentiated signal 406 sharpens the fast variations and particularly suppresses the slow variations in the electronic signal 400. The differentiated noise pulse 407 persists. Also an upper fast-variation threshold 408 and a lower fast-variation threshold 409 are shown as dashed lines.

The trace labeled “4.5 Slow variations” shows slow variation marks 410 and 411 indicating when the integrated signal 403 exceeds either of the slow-variation thresholds 404 or 405 during the RE portion and the second E portion, respectively. The slow-variation thresholds 404 and 405 are preferably set so that the slow variations of voiced sounds generally exceed them, whereas the fast variations of unvoiced sound are suppressed by the integration analysis and generally do not exceed the slow-variation thresholds 404 and 405. Accordingly, the slow variation marks 410 result from the slow variations of the voiced RE portion of the command, and the slow variation marks 411 result from the voiced sound of the second E portion of the command. As an alternative, the magnitude of the integrated signal 403 could have been taken, and then compared only to the upper slow-variation threshold 404 only, with the same result.

In the trace labeled “4.6 Fast variations”, the points where the differentiated signal 406 exceeds the fast-variation thresholds 408 or 409 are indicated as the fast variation marks 413, corresponding to the fast variations of the unvoiced S portion of the command. The noise pulse 402 generates a fast variation detection 412. Also an isolated fast-variation detection 414 occurs unexpectedly, during the second E portion of the command which is a voiced sound. To properly recognize a command, the method must be able to reject such extraneous detections as well as noise pulses.

The trace labeled “4.7 Voiced intervals” shows two intervals of voiced sound, 415 and 416 in the command. The trace labeled “4.8 Unvoiced intervals” shows one interval of unvoiced sound 417 identified in the command. The trace labeled “4.9 Silence” shows when silent intervals 418, 419, and 420 occur. The sound intervals were detected using an interval-detection protocol comprising the rules: (a) a silent period of length Tinit must occur before any command sounds are accepted; (b) the start of a sound interval occurs when Nvar successive signal variations of the same type are detected; (c) the end of the sound interval occurs when Nvar successive signal variations of the opposite type are detected, or when a silent period of duration Ta is detected; (d) the command is finished when a silent time of Tfin is detected. For this example, Nvar is 2, and is the same for both voiced and unvoiced intervals.

First, a silent interval Tinit is demarked. However, the noise pulse 402, with an associated fast variation 407, occurs at time 421 which is before Tinit expires. Therefore, Tinit is then started over. Although the noise pulse 402 is detected, it is not counted as a command sound because it occurs while Tinit is ongoing. Tinit then expires at time 422 without further sound, and the initial silence requirement is satisfied at that time.

The first command sounds in the electronic signal 400 are associated with the slow-variation detections 410. The voiced interval 415 is recognized as soon as two of the slow-variation detections 410 occur in succession, at time 423. Then, at time 424, two successive fast-variation detections 413 occur; hence the voiced interval 415 ends and the unvoiced interval 417 simultaneously begins at time 424.

Two different methods are used to identify the starting and ending times of the interval 417. The starting time of the interval 417, at time 424, corresponds to the arrival of two fast variations 413 which forces the termination of the voiced interval 415 and starts the unvoiced interval 417. The ending time of the voiced interval 417, on the other hand, is determined by detecting silence. Specifically, a silent interval 419 occurs between times 425 and 427.

According to the interval-detection protocol of FIG. 4, a sound interval has ended if a silent period Ta expires with no further sound. To detect such a silence, the Ta period is started when a sound interval is first recognized, and is re-started upon each signal variation of either type detected during a sound interval. When Ta expires, its expiration indicates that the sound interval has ended, and also that the ending time of the interval equals the Ta expiration time, minus Ta. Trace 4.9 shows that the Ta period expires at time 426. Therefore the unvoiced interval 417 is known to have ended at time 425, since this is when the last uninterrupted Ta period begins. Time 425 is also the time of the last detected fast variation 413 from the S sound. Accordingly, the unvoiced interval 417 is shown in trace 4.8 to end at time 425, upon the last detected fast variation 413 from the S sound, and the silent interval 419 is shown in trace 4.9 to begin at the same time, 425.

At time 427, two slow variations 411 are detected sequentially, thereby fulfilling the interval-detection requirement for a voiced interval 416. Therefore at time 427, the silent interval 419 ends and the second voiced interval 416 begins.

The end of the voiced interval 416 is detected by demarking Ta repeatedly until it expires without further sound, which occurs at time 429. When Ta expires, the voiced interval 416 is known to have ended, and also the ending time is exactly Ta earlier, which is at time 428. Accordingly, the silent interval 420 begins at that same time, 428.

A single fast variation detection 414 occurs during the voiced interval 416. However the fast variation detection 414 has no effect because two successive fast variations in succession would be needed to terminate the voiced interval 416. The interval-detection protocol specifies that Nvar=2, so that a single detection of either type is not sufficient to recognize a new sound interval. As soon as the next slow variation 411 occurs, the isolated fast variation 414 is effectively negated. In this way, occasional noise or isolated opposite-type fluctuations in the spoken sound are prevented from interfering with the ongoing interval detection process, and this enhances the reliability of command identification.

The end of the command is detected using a silent time period Tfin. According to the interval-detection protocol for FIG. 4, the Tfin period is started only after Ta expires. This is shown in trace 4.9 at time 426, when the Ta period expires and Tfin is started. The duration of Tfin is shown symbolically by a double-arrow labeled Tfin. However, Tfin is aborted at time 427, when the slow variations 411 begin to arrive. Since additional signal variations are detected before Tfin expires, this indicates that the command is not yet finished.

Tfin is demarked again at time 429, when the Ta period again expires after the voiced interval 416. Since there are no further fast or slow variations detected after that time, Tfin expires at time 430, thereby indicating that the command is ended.

After the command has ended, the command sequence is assembled from the various detected intervals. The command sequence comprises a voiced interval for RE, then an unvoiced S, then a silent interval, then the voiced second E. The command sequence may be displayed as: voiced-unvoiced-silent-voiced. The T is silent, but there is no separate silent interval corresponding to the silent T because it occurs at the end of the command. If a silent interval occurs at the end of a command, that silent interval is indistinguishable from the post-command silence, and thus will not be recognized as a separate interval of silence in the command sequence. The command sequence recognizes only silent intervals that are internal to a command, bounded fore and aft by sound intervals.

As an option, the invention includes the possibility of recognizing a terminal silent consonant such as the silent T, by observing an abrupt cessation in the sound caused by the air passage being blocked at the end of the sounded interval preceding the silent letter. As commonly pronounced in American English, most voiced and unvoiced intervals do not end abruptly, but rather the sound tends to fade down over a time of 10-50 milliseconds or so. An unpronounced terminal consonant, however, causes the sound to end quickly, in a few milliseconds at most. Terminal unpronounced consonants that are potentially detectable by observing the sudden cessation of sound, would include P, T, K, Q, and hard-C. Thus by determining the rate of decline in the sound, a silent terminal consonant could be revealed.

The example of FIG. 4 shows the Tfin period being demarked when Ta expires. As an alternative, the Tfin period could be started at the beginning of the command, and then retriggered upon every signal variation detected. In that case Tfin must be longer than Ta, so that the Ta period expires first, thereby indicating the end of a sound interval, and Tfin expires later, thereby indicating that the command has ended.

As another alternative, the ending time of a sound interval could be recognized as the expiration time of the Ta period, instead of the starting time. In that case the remaining silent interval 419 would still be detected, but would appear shorter by the same amount, Ta. As long as the templates and the command sequence are prepared using the same rules, it does not matter whether the Ta starting or ending time is used for interval detection.

As a further alternative, the number of variations Nvar required to detect a sound interval could be any integer number rather than Nvar=2 as in this example. Larger Nvar numbers enhance reliability by rejecting sounds that produce a few sporadic variations opposite to the sound type. However, as Nvar is increased, it is usually necessary to lower the variation detection thresholds to ensure that every sound in the command produces enough variation detections to exceed Nvar and maintain the same overall sensitivity to sound. If Nvar is made too large, the fast and slow variation thresholds would have to be reduced to the noise level, which is highly un-preferred.

Figure 5:
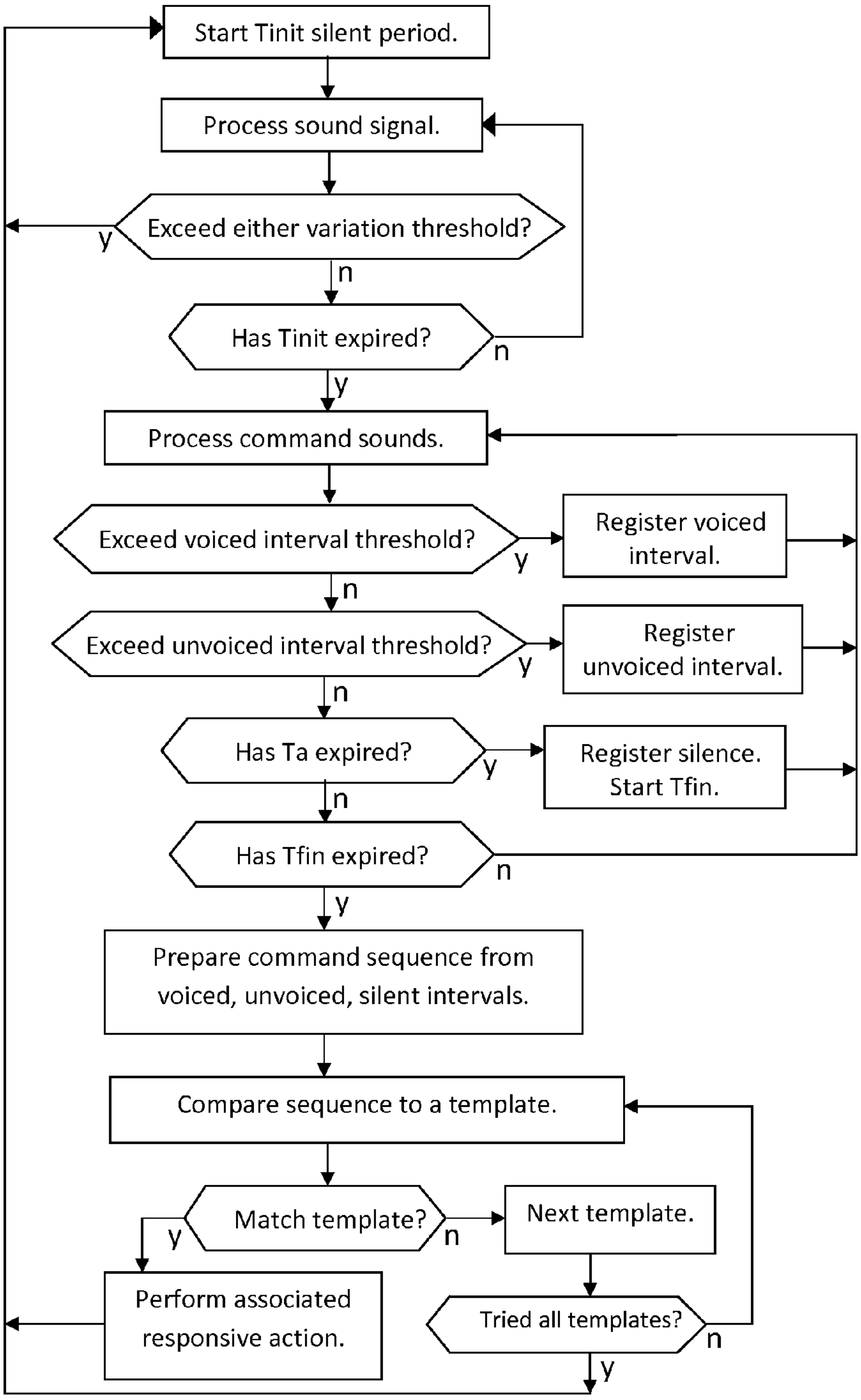
FIG. 5 is a flowchart showing how the time limits of FIG. 4 are analyzed.

FIG. 5 is a flowchart showing how a command is analyzed according to the example of FIG. 4. First, the initial silent period Tinit is demarked. Then the electronic signal is processed, which includes digitizing the electronic signal and calculating the integrated and differentiated signals, all of which is included in the box labeled "Process sound signal". Then, in the decision box labeled "Exceed either variation threshold?" the integrated signal is compared to a slow-variation threshold, and the differentiated signal is compared to a fast-variation threshold. If either signal exceeds its respective threshold, the Tinit period is started over. If no sound is detected, then the Tinit clock is checked in the decision box labeled "Has Tinit expired?". If Tinit has not expired, the electronic signal is again processed for more sounds. When Tinit expires with no further sounds detected, the flow proceeds to the command processing section.

For command processing, the box labeled "Process command sounds" includes digitizing the electronic signal, calculating the integrated and differentiated signals, and detecting fast and slow variations, all as described with reference to FIG. 4. Then, in the decision box labeled "Exceed voiced interval threshold?", the detected slow variations are tested using a voiced interval threshold, to determine if a voiced interval has started. The same interval detection threshold, Nvar=2 variations of the same type, is used to detect both voiced and unvoiced intervals. When the voiced interval threshold is exceeded, a voiced sound interval is recognized in the box labeled "Register voiced interval." This box includes several other tasks implicitly. If the voiced interval threshold is exceeded, but a voiced interval is already started, then the existing voiced interval simply continues and the additional variations are ignored. If the voiced interval threshold is exceeded while an unvoiced interval is already started, the unvoiced interval is ended immediately, thereby avoiding interval overlaps. Also included in the "Process command sounds" box, the Ta period is re-started whenever a signal variation of either type is detected.

If the detected variations do not exceed the voiced sound threshold, then they are also tested for unvoiced sound in the decision box labeled "Exceed unvoiced interval threshold?". When Nvar fast variations are detected in a row, an unvoiced interval is recognized, and the voiced interval, if any, is ended.

After checking the voiced and unvoiced intervals, the Ta clock is then checked in the decision box "Has Ta expired?". If Ta has expired, a silent interval is recognized, and the Tfin period is started at that time, in the box labeled "Register silence. Start Tfin". If, however, Ta has not expired or is not active, then the Tfin clock is checked to see if the command has finished, in the decision box labeled "Has Tfin expired?".

If not, further command sounds are processed. If Tfin has expired, the command is known to have finished, and then the command sequence is then prepared. In the example of FIGS. 4 and 5, the command sequence includes all voiced, unvoiced, and silent intervals in the command.

The command sequence is then compared to each of the templates in turn. The templates also include silent intervals as well as the voiced and unvoiced intervals. If any templates match, then the associated action is selected or performed, in the box "Perform associated responsive action". After that, or if none of the templates match, the method cycles back and resumes waiting for another command by again demarking the Tinit period.

As an alternative, the Ta clock and the Tfin clock could be retriggered upon any sound, not just when fast or slow variations are detected. For example, the digitized signal itself could be compared directly to a digitized voltage threshold, thereby catching any sound regardless of its voiced or unvoiced type. This would be simpler than performing the variation calculations and would be sufficient to detect any and all sounds occurring during a silent interval. However it would not eliminate the need to perform the fast and slow variation analysis, because the fast-slow variation type is needed in order to assign any detected sound to the correct interval. Therefore, directly testing the sound signal itself would be an extra step. Usually it is sufficient, and simpler, to identify both sounded and silent intervals the same way, by detecting fast and slow variations only.

FIG. 6 is a set of tables showing the order of voiced, unvoiced, and silent intervals in various commands. The command sequence that was deduced in the example of FIG. 4 is shown at the top, which is voiced-unvoiced-silent-voiced. Accordingly, the command sequence shown at the top of FIG. 6 has the first interval as voiced, the second as unvoiced, the third as silent (zero in both Voiced and Unvoiced rows), and then the fourth is voiced.

The templates of FIG. 6 include a number of acceptable commands including GO with a single voiced interval, SO with an unvoiced S followed by a voiced O, SET UP with unvoiced-voiced-unvoiced-silent-voiced-unvoiced, and three different pronunciations of RESET including with the T sounded (voiced-unvoiced-voiced-unvoiced), RESE(T) with silent T (voiced-unvoiced-voiced), and RES-E(T) with silent T and a short silence after the S (voiced-unvoiced-silent-voiced). On inspection, it is apparent that the command sequence matches the last template exactly, and thus the inventive procedure has successfully identified the command.

Figure 7:
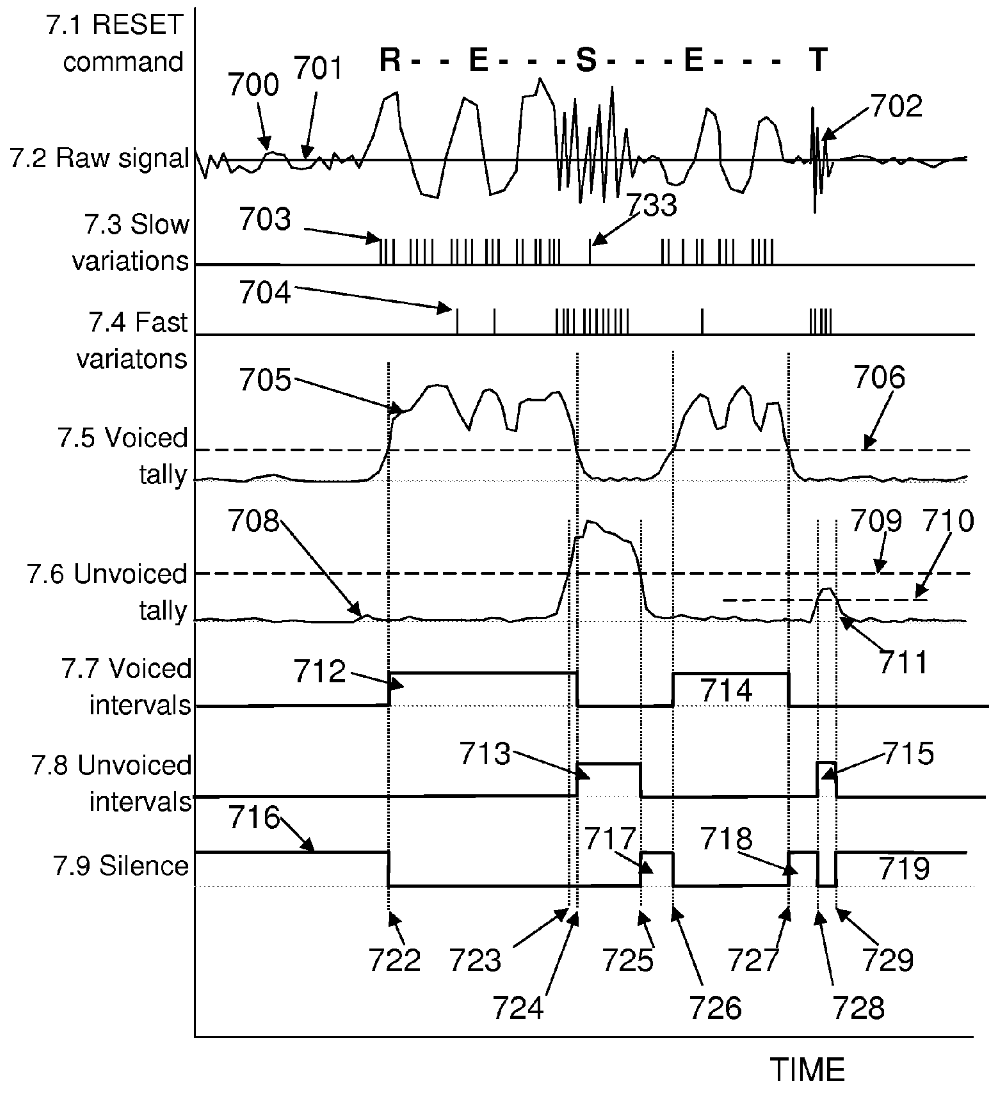
FIG. 7 is a set of graphs showing command analysis using tally counters.

FIG. 7 shows an alternative analysis procedure including tally counters to evaluate the rate of detection of slow and fast variations. The command is shown in "7.1 RESET command" with the letters spread out. The sound signal 700 is shown in the trace "7.2 Raw signal" along with a line 701 representing silence. The T is explicitly spoken in this example, producing a brief unvoiced sound pulse 702.

The traces "7.3 Slow variations" and "7.4 Fast variations" indicate when the integrated and differentiated signals (not shown) exceed their respective thresholds. The slow variation detections 703 indicate when slow variations are detected in the sound signal 700, and the fast variation detections 704 indicate when fast variations are detected. As expected, the slow variation detections 703 occur mainly during the voiced RE portion and the second E portion of the command. However, a single slow variation detection 733 occurs during the unvoiced S portion as well. The fast variation detections 704 occur mainly during the unvoiced S and T portions of the command, although a few isolated fast variation detections occur during the voiced portions. Such opposite-type detections are common in speech processing, due to the complexity of spoken sounds as well as background effects.

The next trace, labeled "7.5 Voiced tally", shows a running voiced tally counter 705 which is incremented when each slow variation 703 is detected. The voiced tally 705 is decremented periodically, but never below zero. The voiced tally 705 increases when the slow variations 703 occur more frequently, as during the voiced portions of the command. The voiced tally 705 subsides when the slow variations 703 cease, as during silent or unvoiced portions. Accordingly, during the voiced RE and second E portions of the command, the slow variations 703 occur more frequently, and the voiced tally 705 increases during those sounds. The voiced tally 705 then subsides when slow variations 703 are absent. Also, the voiced tally 705 exhibits substantial peaks and valleys, due to the natural variability of speech sounds.

The next trace, labeled "7.6 Unvoiced tally", shows an unvoiced tally counter 708 which is incremented upon each fast variation 704, and decremented periodically. The unvoiced tally 708 climbs during the unvoiced S and T sounds, then falls thereafter. The increase 711 observed during the T sound is relatively small because the T sound is brief.

Trace 7.5 also shows a voiced tally threshold 706 as a dashed line, and Trace 7.6 shows an unvoiced tally threshold 709 as a dashed line. There is also an unvoiced-brief tally threshold 710.

In the traces labeled "7.7 Voiced intervals" and "7.8 Unvoiced intervals", sound intervals of each type are identified from the voiced and unvoiced tallies 705 and 708 using an interval-detection protocol. The interval-detection protocol for FIG. 7 is: (a) a voiced or unvoiced interval begins when the associated tally exceeds its threshold, and ends when the tally goes below its threshold; (b) if there is an overlap between voiced and unvoiced intervals, the intruding interval must wait until the pre-existing interval is finished; (c) silent intervals comprise all times when neither a voiced nor an unvoiced interval is present.

The voiced interval 712 corresponding to the RE portion of the command begins when the voiced tally 705 exceeds the voiced tally threshold 706 at time 722, and ends when the voiced tally 705 drops back below the voiced tally threshold 706 at time 724. Another voiced interval 714, corresponding to the second E, begins at time 726 when the voiced tally 705 again exceeds the voiced tally threshold 706, and ends at time 727.

In Trace 7.8, the unvoiced interval 713 corresponding to the unvoiced S sound begins at time 724. The unvoiced tally 708 exceeds the unvoiced tally threshold 709 at an earlier time, 723; however the voiced interval 712 is still in progress at that time, and because the protocol gives the pre-established interval priority in any overlap, the unvoiced interval 713 is not recognized until the voiced interval 712 ends, at time 724. Thereafter, the unvoiced interval 713 proceeds until time 725 when the unvoiced tally 708 again drops below the unvoiced tally threshold 709.

Trace 7.8 also shows a brief unvoiced interval 715, corresponding to the T portion of the command. The interval 715 is detected slightly differently from the others. Due to the short duration of the T sound, the unvoiced tally 708 does not have enough time to build up to the unvoiced tally threshold 709. Therefore an unvoiced-brief tally threshold 710 is provided, along with an additional protocol rule: (d) if a tally counter exceeds a lower threshold but not an upper threshold, then a sound interval of the brief type is detected while the tally exceeds the lower threshold; however if a tally exceeds a lower threshold and then exceeds an upper threshold, then a regular non-brief interval is recognized. Following this rule, the small tally rise 711 is recognized as a brief unvoiced interval 715, occurring between times 728 and 729 while the unvoiced tally 708 exceeds the unvoiced-brief tally threshold 710.

In Trace "7.9 Silence", intervals of silence are shown. First an initial silent interval 716 is shown, ending when the first voiced interval 712 begins. The silent interval 717 begins after the unvoiced S sound at time 725, and continues until the second E sound begins at time 725. The silent interval 717 corresponds to the time needed for the vocal cords to begin resonating before producing the E sound. (In reality the resonance delay is short. It is exaggerated in FIG. 7 to illustrate the inventive principles.)

Continuing with trace 7.9, a silent interval 718 is recognized between times 727 and 728, corresponding to the time that the air passage is blocked before generating the T sound. A final silent interval 719 indicates that the command has ended.

The command sequence is derived from the voiced and unvoiced and silent intervals. The initial and final silent intervals 716 and 719 are not included in the command sequence, because they are always present for any command. The internal silent intervals 717 and 718 may be included in the command sequence and in the templates to ensure detailed matching between the sound pattern and the template. However, brief internal silent intervals are highly variable and speaker-dependent. Therefore it is not recommended that brief internal silences be relied upon for matching the command. Typically a brief silent interval is ignored if it is shorter than some cutoff time Tminimum. If the brief silences are included in the command sequence, it is recommended that multiple templates be provided, with and without each of these intervals, to ensure that the command as-spoken will match one of the templates.

Another alternative regarding brief intervals, both sounded and silent, is to include information in the templates about the expected duration of the various intervals, and likewise to include information in the command sequence about the observed durations of the intervals. For example the command sequence may be a series of memory elements corresponding to each detected interval, and each element could be set to a 1 if a sustained-voiced interval is detected, 2 if a brief-voiced interval, 3 if sustained-unvoiced, 4 if brief-unvoiced, 5 if sustained-silent, and 6 if brief-silent. Templates would contain the same information about the acceptable commands. Furthermore, some of the intervals may be marked as optional. For example, the brief intervals might be skipped, depending on how the command is actually spoken. In the matching process, then, a template would be assumed to match a command sequence even if they differ in one or more of the optional features. Such a flexible matching scheme largely avoids the issue of brief intervals being unreliable.

Another option regards the rule for detecting a silent interval. In the example of FIG. 7, a silent interval is any interval not occupied by a voiced or unvoiced interval, which may be termed the no-sound-interval rule for detecting silent intervals. This rule provides a robust, flexible criterion for identifying silent times within a command. The no-sound-interval rule is the preferred rule for silence detection interior to a command. To detect the initial and final silences, however, a more sensitive rule is preferred, such as requiring that no fast or slow signal variations occur, or that the sound signal itself not exceed a sound threshold.

In the example of FIG. 7, tally counters are used to identify sound intervals. An advantage of the tally method is that occasional isolated signal variations are usually not sufficient to raise the tally above the interval detection threshold, and thus are successfully rejected. It is quite common to see a few fast variations during voiced speech, or isolated slow variations during unvoiced speech. The number of such opposite-type sound detections can be reduced by raising the sound variation detection thresholds, but then the user would have to speak louder, which would be an undesired solution. The tally method makes that unnecessary. The tally exceeds its tally threshold only when multiple fast or slow variations are detected in a relatively short time. For example, the isolated slow variation 733 occurs unexpectedly during the unvoiced S portion of the command, but it is not sufficient to raise the voiced tally 705 above the voiced tally threshold 706, and thus has no effect. The isolated fast variations 704 detected during the voiced portions of the command also fail to move the unvoiced tally 708. Preferably the tally thresholds are set high enough that such opposite-type variations are insufficient to register as a sound interval. Typically the tally thresholds are set in the range of 10 to 100 counts, although the optimal tally threshold will depend somewhat on the variation-detection thresholds as well as the system gain. The tally method is good at detecting sound intervals with stronger signals, while filtering out occasional opposite-type signal variations. Also it should be noted that the circular buffer method with time-binning performs almost as well as the tally method, and thus is an alternative preferred method for detecting sound and silent intervals.

The voiced tally 705 exhibits substantial fluctuations during both voiced sounds. This is common in voiced speech. Preferably the voiced tally threshold 706 is set low enough that the voiced tally 705 does not dip below the threshold 706 until each sound interval is really finished. However, setting the threshold 706 sufficiently low may allow noise or other acoustical problems to occur. Therefore the invention includes means for reassembling a sound interval even if interrupted multiple times by the fluctuations causing the tally to briefly dip below the respective tally threshold. For example, the period Ta could be demarked when a tally drops below its threshold, and then, if the tally rises back above the threshold before Ta is up, the Ta period would be aborted and the sound interval would be assumed to be continuing without any interruption. Thus any tally fluctuations shorter than Ta would be ignored and would not be allowed to fragment the sound interval. Further means to address this issue are provided with reference to FIG. 8.

Figure 8:
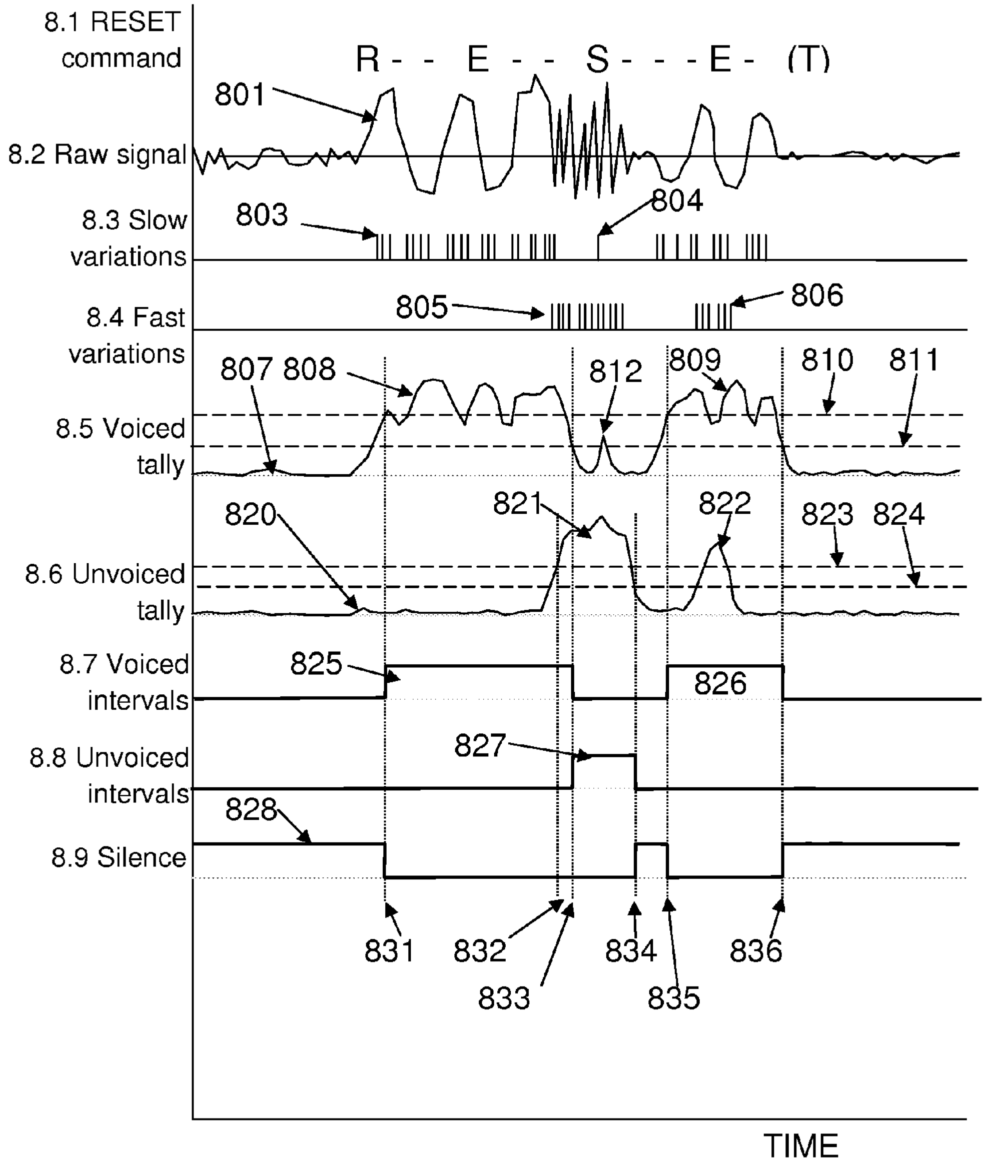
FIG. 8 is a set of graphs showing command analysis using channel hysteresis.

FIG. 8 is a set of graphs showing how a command is analyzed including channel hysteresis and cross-channel suppression. Channel hysteresis is illustrated by use of two tally thresholds, wherein a sound interval is recognized when a tally exceeds the higher threshold, and ends when the tally drops below the lower threshold. Cross-channel suppression also involves two tally thresholds, but with the upper tally threshold being applied to one channel whenever there is a sound interval present on the other channel.

The command is RESE(T), with the T being silent, as shown in "8.1 RESET command". The sound signal 801 is shown in the trace "8.2 Raw signal". Slow variation detections 803 are shown in the trace "8.3 Slow variations". As expected, slow variation detections 803 occur during the voiced RE and second E portions of the command. In addition, an isolated slow variation detection 804 occurs during the unvoiced S portion of the command, due perhaps to noise or to some unknown fluctuation in the command sound.

In the trace "8.4 Fast variations", fast variation detections 805 are shown during the S sound, plus a cluster of fast variation detections 806 during the second E of the command.

The E is a voiced sound and thus should have only slow variations; however speech is not ideal, and such opposite-type variations commonly occur. Sometimes this is due to a raspy voice, background noises, amplifier saturation, or a threshold being set too low, among other potential causes. Whatever the cause, the command must be analyzed correctly despite the unexpected signals.

The next trace, "8.5 Voiced tally", shows the voiced tally 807 including regions 808 and 809 corresponding to the voiced RE and E portions of the command, respectively. A brief tally rise 812 also occurs due to the slow variation detection 804 during the S. Also shown as dashed lines are an upper voiced tally threshold 810 and a lower voiced tally threshold 811.

The next trace, "8.6 Unvoiced tally", shows the unvoiced tally 820 including a region 821 corresponding to the unvoiced S portion of the command, and a region 822 corresponding to the fast variation detections 806 which are unexpectedly detected during the second E of the command. Also shown are an upper and lower unvoiced tally threshold, 823 and 824 respectively, as dashed lines.

The next traces, "8.7 Voiced intervals" and "8.8 Unvoiced intervals", show the voiced intervals 825 and 826, and unvoiced interval 827, which are identified using the tally counters 807 and 820 and using an interval-detection protocol. The trace "8.9 Silence" shows the silent intervals. Various times are shown as vertical dotted lines. For FIG. 8, the interval-detection protocol comprises the rules: (a) Start a sound interval (voiced or unvoiced) when the associated tally exceeds an upper tally threshold; (b) End the interval when the tally drops below a lower tally threshold; (c) In case of an overlap between voiced and unvoiced intervals, the unvoiced interval is inhibited and the voiced interval prevails; (d) A silent interval exists whenever there is no voiced or unvoiced interval. Rules (a) and (b) comprise channel hysteresis, while rule (c) is an example of asymmetric cross-channel suppression.

The voiced sound interval 825 starts at time 831, when the voiced tally 807 exceeds the upper voiced tally threshold 810, and ends at time 833 when the voiced tally 807 drops below the lower voiced tally threshold 811. The voiced tally 807 exhibits several fluctuations which cause the voiced tally 807 to vary above and below the upper voiced tally threshold 810. However, the fluctuations have no effect because the lower voiced tally threshold 811 is in force while the voiced interval 825 is present; and since the voiced tally 807 never goes below the lower voiced tally threshold 811 during the RE portion of the command, the fluctuations in the voiced tally 807 are not sufficient to interrupt the voiced interval 825. This shows the value of channel hysteresis. Absent hysteresis, the upper tally threshold 810 would have been applied throughout the command, and then the voiced interval 825 would have been broken into multiple parts whenever the voiced tally 807 dips below the upper tally threshold 810. Such an interval breakup would complicate the command interpretation, probably requiring a special routine for recombining fragmented intervals to reconstruct the actual voiced interval 825. But by simply switching to the lower voiced tally threshold 811 during the voiced interval 825, channel hysteresis has successfully eliminated any effect of tally fluctuations.

A voiced tally peak 812 occurs during the S portion of the command, due to the isolated slow variation 804. The peak 812 rises above the lower voiced tally threshold 811. However, the upper voiced tally threshold 810 is applied at that time because no voiced interval is present when the peak 812 occurs. Since the peak 812 fails to exceed the upper voiced tally threshold 810, the peak 812 has no effect. In this way, channel hysteresis successfully rejects the isolated slow variation 804, and its associated tally peak 812.

Continuing with trace 8.7, a second voiced interval 826 is indicated, starting at time 835 when the voiced tally 807 again exceeds the upper voiced tally threshold 810. The voiced interval 826 ends at time 836 when the voiced tally 807 drops below the lower voiced tally threshold 811. The voiced tally 807 again exhibits a lot of fluctuations during the E region 809, but since the voiced tally 807 remains above the lower voiced tally threshold 811, the fluctuations have no effect.

Trace 8.8 shows a single unvoiced interval 827, starting at time 833 and ending at time 834, corresponding to the S portion of the command. The unvoiced tally 820 exceeds the upper unvoiced tally threshold 823 at time 832, which is earlier than the time 833. Nevertheless, the unvoiced interval 827 does not start at time 832 because the voiced interval 825 is already present, and the interval-detection protocol states that voiced intervals prevail in case of any conflict. Therefore the unvoiced interval 827 is not started at time 823 when the unvoiced tally 820 exceeds the upper unvoiced tally threshold 823, but starts instead at time 833 when the voiced interval 825 ends.

The unvoiced tally 820 includes a second peak 822, which exceeds both the lower and upper unvoiced tally thresholds 824 and 823. However, the voiced interval 826 is present at that time, and the protocol gives voiced intervals dominance over unvoiced. Therefore the peak 822 has no effect. This is an example of cross-channel suppression, in that an established signal on one channel (voiced) suppresses the opposite channel (unvoiced). Also, it is asymmetric suppression because the unvoiced channel has no such rights. Importantly, asymmetric cross-channel suppression resolves the potential overlap, and avoids any effect from the unexpected fast variations 806.

Cross-channel suppression was arranged asymmetrically in FIG. 8, to inhibit unvoiced intervals whenever voiced intervals are present. Alternatively, the protocol could be arranged symmetrically, for example by specifying that whichever channel is already active inhibits the other channel. If both channels have similar sound intensity and noise, then symmetric cross-channel suppression is appropriate. But if one channel is stronger, or less noisy, or carries more information for command identification, then asymmetric cross-channel suppression is preferred.

Figure 9:
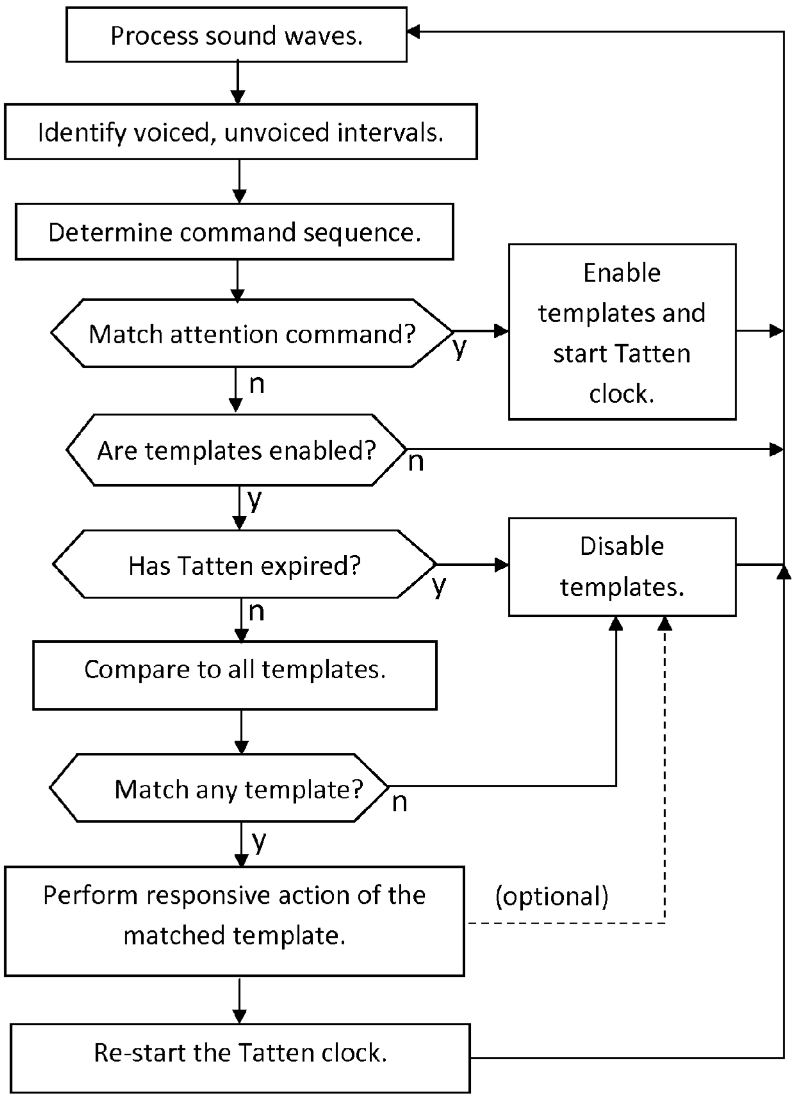
FIG. 9 is a flowchart showing how an attention command is processed.

FIG. 9 is a flowchart illustrating the steps for employing an attention command. The application includes an attention command and several directive commands, each command having an associated template. The user first calls the attention command. The predetermined action of the attention command is to enable the directive commands. Then the user calls any one of the directive commands. In the example of FIG. 9, the attention command enables the directive commands only for a short time of Tatten.

As shown in the flowchart of FIG. 9, sounds are first processed, which includes amplifying, digitizing, calculating integrated and differentiated signals, and detecting fast and slow signal variations, all in the box "Process sound waves". Then, voiced and unvoiced intervals are detected from the fast and slow variations according to an interval-detection protocol in the box "Identify voiced, unvoiced intervals". Then, the command sequence is determined from the voiced and unvoiced intervals in the box "Determine command sequence". Then, in the decision box "Match attention command?", the command sequence is compared to the template of the attention command. If the command sequence matches the attention command template, then all of the directive templates are enabled, and the Tatten clock is started, and the flow then returns to the beginning to process more sounds.

If the command sequence does not match the attention command, then the enabled or disabled state of the directive command templates is checked, in the decision box "Are templates enabled?". If the directive templates are not enabled, then the flow goes back to the beginning. But if templates are enabled, the status of the Tatten clock is then checked in the decision box "Has Tatten expired?". If Tatten has expired, then the templates are immediately disabled. However if Tatten has not yet expired, this means that the directive commands are still enabled, and therefore the flow proceeds to the remaining template comparisons.

In the box "Compare to all templates" the command sequence is compared to each of the directive templates in turn. If the command sequence does not match any template, then the directive commands are disabled. Disabling the directive commands upon a non-matching command prevents false triggers coming from noise for example. If the command sequence matches any of the templates, then the associated responsive action is performed, and the Tatten clock is again re-started. Re-starting the Tatten clock after each successful command is convenient for users because it allows them to call multiple directive commands after a single attention command, without having to repeat the attention command each time. However, in some applications it is preferable to disable the directive commands after each successful match; accordingly a dotted arrow labeled "(optional)" shows an alternate flow wherein the templates are disabled after each command. In either case, the flow then returns back to the start, waiting for the sound of the next command.

The attention command provides greatly improved rejection of background noises. Especially, this prevents non-command sounds that resemble a directive command from triggering an unintended application response. If a background noise resembling a directive command occurs without the attention command, nothing happens because the directive commands are still disabled. If a background sound resembling the attention command occurs, the application becomes enabled for a short time, and then reverts to the disabled state, so again no harm is done. An unintended trigger could occur only if the background sounds first resemble the attention command, and then further background sounds resembling a directive command occur before Tatten expires. In that particular case the application will trigger falsely; but that is expected to be a very rare occurrence.

As shown in FIG. 9, the Tatten clock is checked only when a command is received and does not match the attention command. As an alternative, the Tatten clock could issue an interrupt or other action immediately when the Tatten period expires, thus causing the templates to be disabled at that time. The former method is preferred, however, because it allows a user to complete a command that is already started when Tatten expires. Users do not like to be cut off while they are speaking their command.

As shown in FIG. 9, the method allows directive commands to be received for a specific time, Tatten, after the attention command is received. As an alternative, an unlimited time could be allowed. In that case the directive commands would be enabled by the attention command, and then could be called at any time upon the user's discretion. The advantage of eliminating the time limit is that the user would not feel rushed to speak the directive command. The method would have to provide means for subsequently disabling the directive commands. For example, the directive commands could be disabled upon any valid command, thereby ensuring that only one directive command at a time can be carried out. In that case the user would have to speak the attention command before every directive command, which is desirable in some applications. To implement this option, the time limit Tatten is set to infinity, and the templates are disabled after each responsive action, as shown by a dashed arrow in the flowchart.

As a further option, the directive commands could be disabled upon any invalid command, or upon a background sound, or any non-matching command sound, in order to shut down responses to prevent a false trigger.

As a further alternative, the attention command could enable the directive commands without time limit, and then the same attention command could subsequently disable them when it is called a second time. Thus the attention command alternates between enabling and disabling each time it is called.

As a further alternative, there could be an enable command and a separate disable command. The enable command can be received at any time, and it enables the directive commands without time limit. The disable command can be received at any time, and it disables the directive commands without time limit. Thus the user controls the enabling and disabling of the directive commands by direct voice control.

FIG. 10 shows the templates for the case last described, wherein an enable command enables the directive commands, and a separate disable command disables the directive commands. The enable command is START PROCESS, and the disable command is END PROCESS. These commands enable and disable the directive commands at any time, and without time limit. In this way a user can easily start a voice-activated system, perform any number of operations by speaking directive commands, and then stop the system when finished, entirely under voice control. The figure also shows a number of example templates for directive commands, including voiced and unvoiced intervals and silent intervals.

The examples demonstrate that the inventive method can identify a spoken command and select its associated responsive action, by determining the order of voiced and unvoiced intervals and optionally silent intervals. Unlike prior art systems for free-form speech interpretation, the inventive method does not rely on expensive wireless data links, remote supercomputers, memory-intensive frequency transformations, or processor-intensive statistical models of any kind. The inventive method does not inflict a tedious training process on the user. The inventive method is deterministic, real-time, economical, and fast. The inventive method can be implemented in an extremely low-cost 8-bit microcontroller with a single ADC input and a few internal registers. There is no need to store large amounts of data, and no need for large internal or external memories. Also unlike prior art systems, the inventive method is capable of extremely low error rates, so long as each acceptable command has a distinct order of voiced and unvoiced intervals.

If an application does not need free-form speech interpretation to perform its functions, then the burden of free-form speech software would be detrimental as well as costly. Any speech recognition routine that divides the sound into short segments is likely to miss the larger pattern of sound intervals that define the command. Likewise any routine that includes frequency transformation is likely to miss key sonic features in the time domain, because the transformation process necessarily blends sound-type recognition features such as fast and slow variations in the signal. Moreover, many prior art methods break the command sound into smaller units and subunits, and then apply statistical tests to the smallest units. But if the intent is to simply identify a predetermined command, this is the wrong order of processing. The inventive method, in contrast, starts with the smallest identifiable features in the sound, namely the instantaneous rate of change of the sound signal, and then proceeds to identify voiced and unvoiced sound, and then assembles the overall structure of the command in real time.

The inventive method makes a wide range of applications economically feasible. Simpler devices and single-purpose gadgets and embedded instrument modules would be suitable uses for the inventive method. Essentially any device that can be fully served by a few predetermined commands would not be helped by the prior art speech recognition options; in fact such software would be burdensome and frustrating. The low hardware cost and simple software involved in the inventive method will make these applications economically feasible for the first time, ranging from novelties and games, to household convenience devices, to test and measurement instrumentation, and even life-saving medical instruments. Any device that needs to respond in a predetermined way to a few predetermined spoken commands is a good candidate for the inventive method.

The embodiments and examples provided herein illustrate the principles of the invention and its practical application, thereby enabling one of ordinary skill in the art to best utilize the invention. Many other variations and modifications and other uses will become apparent to those skilled in the art, without departing from the scope of the invention, which is to be defined by the appended claims.

The invention claimed is:

1. A method to identify a spoken command comprising voiced and unvoiced intervals in a particular order, and to responsively select an action from a set of predetermined actions, said method comprising the steps:

3.1 Converting sound of the spoken command into a digital signal comprising periodic digital measurements of the sound using a transducer and a converter;

3.2 Analyzing the digital signal to detect slow variations therein, by deriving an integrated signal by additively combining successive digital measurements, and comparing the integrated signal to a slow-variation threshold, a slow variation being detected when the integrated signal exceeds the slow-variation threshold;

3.3 Analyzing the digital signal to detect fast variations therein, by deriving a differentiated signal by subtractively combining successive digital measurements, and comparing the differentiated signal to a fast-variation threshold, a fast variation being detected when the differentiated signal exceeds the fast-variation threshold;

3.4 Analyzing the slow variations to detect voiced intervals having voiced sound, and analyzing the fast variations to detect unvoiced intervals having unvoiced sound;

3.5 Preparing a command sequence indicating the order of voiced and unvoiced intervals in the spoken command;

3.6 Comparing the command sequence to templates that indicate the order of voiced and unvoiced intervals in acceptable commands using a computer, each template being associated with one action in the set of predetermined actions;

3.7 And, when the command matches one of the templates, selecting the action associated with the matched template.

2. The method of claim 1 wherein the periodic digital measurements have a measurement period in the range of 0.02 to 0.15 millisecond, and the fast variations comprise changes in the digital signal occurring in a time shorter than a time Tfs, and slow variations comprise changes in the digital signal occurring in a time longer than Tfs, and Tfs is in the range of 0.1 to 0.5 millisecond.

3. The method of claim 1 wherein Step 3.2 includes calculating an average of Nay successive digital measurements minus Vsilence, wherein Nay is an integer, Vsilence is a digital value representing silence, the digital measurements have a periodic spacing of Tdig, and the product Tdig*Nav is in the range of 0.3 to 2.0 milliseconds.

4. The method of claim 1 wherein Step 3.3 includes calculating a discrete differential involving successive digital measurements V1, V2, V3, V4, and V5, and the discrete differential is calculated according to a formula in the set of:

((V1+V3)/2−V2);

(V1−V2+V3−V4);

((V1+V3)/2−(V2+V4)/2);

(((V1+V5)/2+V3)/2−(V2+V4)/2);

and (0.5*V1−V2+V3−V4+0.5*V5).

5. The method of claim 1 which further includes the steps:

8.1 Detecting intervals of silence in the spoken command;

8.2 Including, in the command sequence, information on the order of unvoiced and voiced and silent intervals in the spoken command;

8.3 And comparing the command sequence to templates that include information on the order of voiced and unvoiced and silent intervals in acceptable commands.

6. The method of claim 1 which further includes a variable slow-variation threshold, a predetermined lower value, and a predetermined upper value which is higher than the lower value, said method including the steps:

9.1 Additively combining successive digitized sound measurements, thereby deriving an integrated signal;

9.2 Setting the slow-variation threshold equal to the lower value when a voiced interval is detected, and setting the slow-variation threshold equal to the upper value when the voiced interval ends;

9.3 And comparing the integrated signal to the slow-variation threshold so obtained, a slow variation being detected whenever the integrated signal exceeds the slow-variation threshold.

7. The method of claim 1 which further provides enhanced sensitivity for detecting fast variations when an unvoiced interval is present, said method including the steps:

10.1 Preparing a variable fast-variation threshold, a predetermined lower value, and a predetermined upper value which is higher than the lower value;

10.2 Subtractively combining successive digitized sound measurements, thereby deriving a differentiated signal;

10.3 Setting the fast-variation threshold equal to the lower value when an unvoiced interval is detected, and setting the fast-variation threshold equal to the upper value when the unvoiced interval ends;

10.4 And comparing the differentiated signal to the fast-variation threshold so obtained, a fast variation being detected whenever the differentiated signal exceeds the fast-variation threshold.

8. The method of claim 1 which further suppresses fast variations while a voiced interval is present, and wherein a fast-variation threshold is variable, a predetermined lower value is lower than a predetermined upper value, and Step 3.3 further includes the steps:

11.1 Subtractively combining successive digitized sound measurements, thereby deriving a differentiated signal that includes the fast variations and excludes the slow variations of the sound;

11.2 Setting the fast-variation threshold equal to the upper value when a voiced interval is detected, and setting the fast-variation threshold equal to the lower value when the voiced interval ends;

11.3 And comparing the differentiated signal to the fast-variation threshold so obtained, a fast variation being detected whenever the differentiated signal exceeds the fast-variation threshold.

9. The method of claim 1 which further suppresses slow variations while an unvoiced interval is present, and wherein a slow-variation threshold is variable, a predetermined lower value is lower than a predetermined upper value, and Step 3.2 further includes the steps:

12.1 Additively combining successive digitized sound measurements, thereby deriving an integrated signal that includes the slow variations and excludes the fast variations of the sound;

12.2 Setting the slow-variation threshold equal to the upper value when an unvoiced interval is detected, and setting the slow-variation threshold equal to the lower value when the unvoiced interval ends;

12.3 And comparing the integrated signal to the slow-variation threshold so obtained, a slow variation being detected whenever the integrated signal exceeds the slow-variation threshold.

10. The method of claim 1 which further includes asymmetric cross-channel suppression by including one step in the set of:

13.1 Inhibiting the detection of fast variations of the digitized signal whenever a voiced interval is present;

13.2 Inhibiting the detection of slow variations of the digitized signal whenever an unvoiced interval is present;

13.3 Inhibiting the detection of unvoiced intervals whenever a voiced interval is present;

13.4 Inhibiting the detection of voiced intervals whenever an unvoiced interval is present.

11. The method of claim 1 wherein NSvar and NFvar are positive integers, and wherein Step 3.4 further includes the steps:

14.1 Determining that a voiced interval begins when NSvar slow variations are detected in succession;

14.2 And determining that an unvoiced interval begins when NFvar fast variations are detected in succession.

12. The method of claim 1 wherein Step 3.4 further includes determining when a sound interval ends, the sound interval comprising a voiced or unvoiced interval, said method including the steps:

15.1 Demarking a period of length Ta when the sound interval begins;

15.2 Re-starting the Ta period demarcation whenever any slow variation or fast variation is detected before Ta expires;

15.3 And determining that the sound interval has ended if Ta expires with no further slow or fast variations detected therein.

13. The method of claim 1 which includes a voiced tally counter and an unvoiced tally counter, each tally counter being incrementable and decrementable, and wherein Step 3.4 further includes the steps:

16.1 Incrementing the voiced tally counter when each slow variation is detected, and incrementing the unvoiced tally counter when each fast variation is detected;

16.2 Decrementing both tally counters periodically;

16.3 Comparing the voiced tally counter to a voiced tally threshold, a voiced interval being detected when the voiced tally counter exceeds the voiced tally threshold;

16.4 And comparing the unvoiced tally counter to an unvoiced tally threshold, an unvoiced interval being detected when the unvoiced tally counter exceeds the unvoiced tally threshold.

14. The method of claim 1 which further includes a voiced tally counter, a lower tally threshold, and an upper tally threshold which is higher than the lower tally threshold, and wherein Step 3.4 implements channel hysteresis by including the steps:

17.1 Incrementing the voiced tally counter when each slow variation is detected;

17.2 Decrementing the voiced tally counter periodically;

17.3 Determining that a voiced interval begins when the voiced tally counter exceeds the upper tally threshold;

17.4 And determining that the voiced interval ends when the voiced tally counter drops below the lower tally threshold.

15. The method of claim 1 which further suppresses detection of unvoiced intervals while a voiced interval is present, by further including in Step 3.4 the steps:

18.1 Preparing an unvoiced tally counter, an unvoiced tally threshold which is variable, a predetermined lower value, and a predetermined upper value which is higher than the lower value;

18.2 Incrementing the unvoiced tally counter when each fast variation is detected, and decrementing the unvoiced tally counter periodically;

18.3 Setting the unvoiced tally threshold equal to the upper value when a voiced interval is recognized, and setting the unvoiced tally threshold equal to the lower value when the voiced interval ends;

18.4 And detecting an unvoiced interval when the unvoiced tally counter exceeds the unvoiced tally threshold so obtained.

16. The method of claim 1 which further includes an attention command associated with an attention template, directive commands associated with directive templates, and a gate parameter that can be set to enabling or disabling; and wherein Step 3.6 includes the steps:

19.1 While the gate parameter is enabling, comparing the command sequence to the directive templates;

19.2 While the gate parameter is disabling, comparing the command sequence only to the attention template;

19.3 Setting the gate parameter to enabling when the command sequence matches the attention template;

19.4 And setting the gate parameter to disabling when either: (a) the command sequence matches the attention template while the gate parameter is enabling, or (b) the command sequence matches a disabling template which is different from the attention template, or (c) the command sequence matches one of the directive templates, or (d) a predetermined time period of length Tatten expires, Tatten being in the range of 0.5 to 10 seconds.

17. The method of claim 1 wherein a predetermined action includes either changing a predetermined action or changing a template.

* * * * *